US012779662B2

(12) United States Patent
Choi

(10) Patent No.: US 12,779,662 B2
(45) Date of Patent: Nov. 3, 2026

(54) ROBOT AND METHOD OF CONTROLLING ROBOT

(71) Applicant: LG ELECTRONICS INC., Seoul (KR)

(72) Inventor: Dongkyu Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 55 days.

(21) Appl. No.: 18/846,129

(22) PCT Filed: Mar. 2, 2023

(86) PCT No.: PCT/KR2023/002849
§ 371 (c)(1),
(2) Date: Sep. 11, 2024

(87) PCT Pub. No.: WO2023/171974
PCT Pub. Date: Sep. 14, 2023

(65) Prior Publication Data

US 2025/0187171 A1 Jun. 12, 2025

(30) Foreign Application Priority Data

Mar. 11, 2022 (KR) ........................ 10-2022-0030759

(51) Int. Cl.
*G06F 17/00* (2019.01)
*B25J 5/00* (2006.01)
(Continued)

(52) U.S. Cl.
CPC ............. *B25J 5/007* (2013.01); *B25J 9/0009* (2013.01); *B25J 13/087* (2013.01); *B25J 19/005* (2013.01)

(58) Field of Classification Search
CPC ........ B25J 5/007; B25J 9/0009; B25J 13/087; B25J 19/005; B25J 9/0003; B25J 9/08;
(Continued)

(56) References Cited

U.S. PATENT DOCUMENTS

2011/0054681 A1* 3/2011 Amino ................. B62D 57/028
180/8.3

FOREIGN PATENT DOCUMENTS

CN 211032803 U 7/2020
CN 214875226 U * 11/2021
(Continued)

OTHER PUBLICATIONS

Two-Wheel Inverted Musculoskeletal Pendulum (Year: 2024).*
(Continued)

*Primary Examiner* — Ronnie M Mancho
(74) *Attorney, Agent, or Firm* — Birch, Stewart, Kolasch & Birch, LLP

(57) ABSTRACT

A robot capable of maintaining a horizontal attitude, by controlling driving of a motor wheel and/or a suspension wheel according to a tilting direction and degree of a robot body, thereby enabling horizontal control of attitude. The robot may be configured to sequentially or selectively control left and right suspension motors without controlling the same at the same time when the left and right tilt of the robot body is corrected, thereby saving battery power. In addition, since the robot includes a contact detection sensor to detect whether a wheel is in contact with a ground, the robot can easily maintain balance without falling over even when a user lifts the robot and put the same back down.

18 Claims, 28 Drawing Sheets

(51) Int. Cl.

*B25J 9/00* (2006.01)
*B25J 13/08* (2006.01)
*B25J 19/00* (2006.01)

(58) Field of Classification Search

CPC ........ B25J 11/008; B25J 13/08; B25J 13/089; B25J 19/0091; B62D 57/028; B60G 11/14; B60G 17/0165

USPC .......................................................... 700/245

See application file for complete search history.

(56) References Cited

FOREIGN PATENT DOCUMENTS

| | | | | | |
|---|---|---|---|---|---|
| JP | 61-92906 | A | | 5/1986 | |
| JP | 2011-45973 | A | | 3/2011 | |
| JP | 4857242 | B2 | * | 1/2012 | ............ B25J 19/023 |
| JP | 5728081 | B2 | * | 6/2015 | .............. B25J 17/00 |
| JP | 5746347 | B2 | * | 7/2015 | ............. G06V 20/58 |
| JP | 5923621 | B2 | * | 5/2016 | ........... B62D 57/024 |
| JP | 6006780 | B2 | * | 10/2016 | ......... B60B 33/0052 |
| JP | 6588624 | B2 | * | 10/2019 | .......... B25J 19/0075 |
| WO | WO-2014076837 | A1 | * | 5/2014 | ........... B62D 57/024 |

OTHER PUBLICATIONS

Ascento, "LQR-Assisted Whole-Body Control of a Wheeled Bipedal Robot with Kinematic Loops (RA-L / ICRA 2020)," Feb. 11, 2020, XP093251906, pp. 1-3.

* cited by examiner

[FIG. 1]
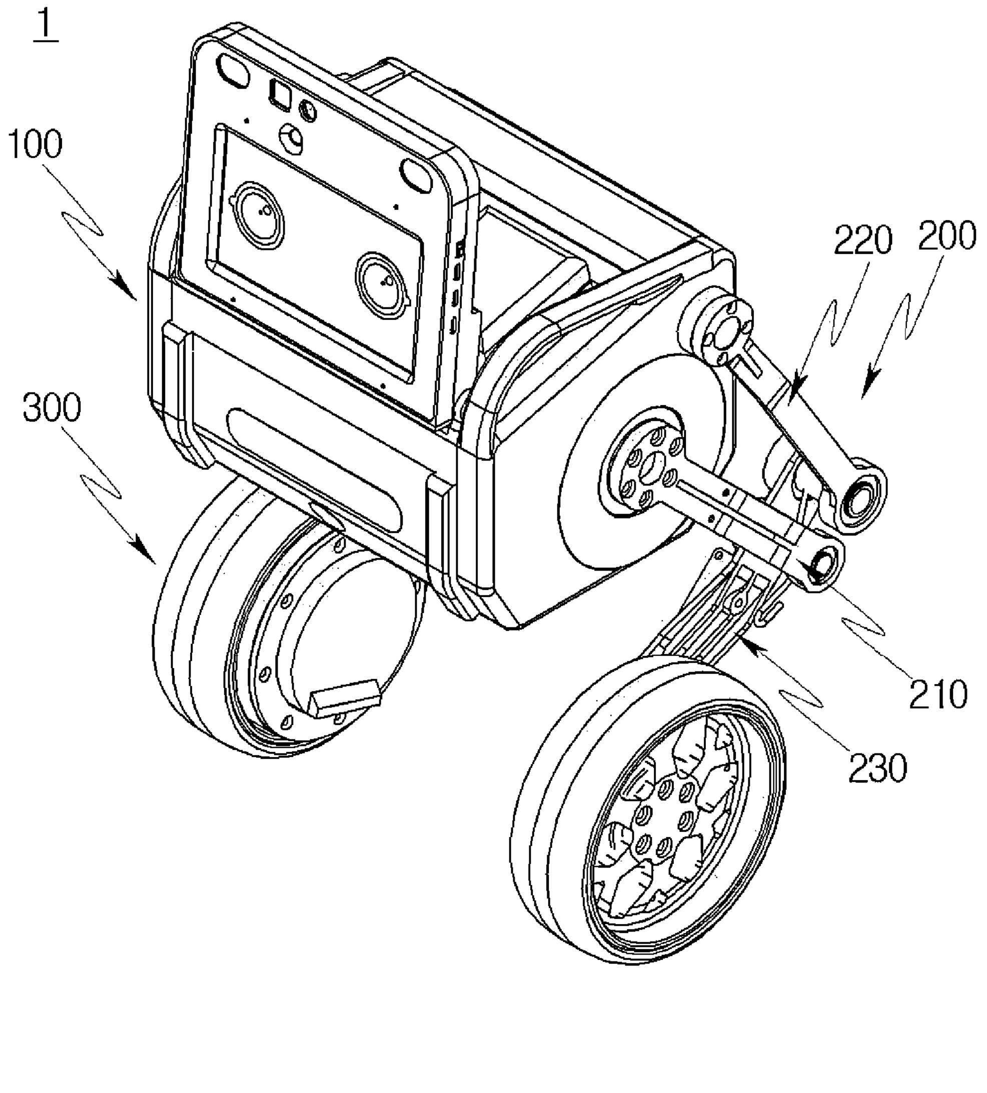

[FIG. 2]
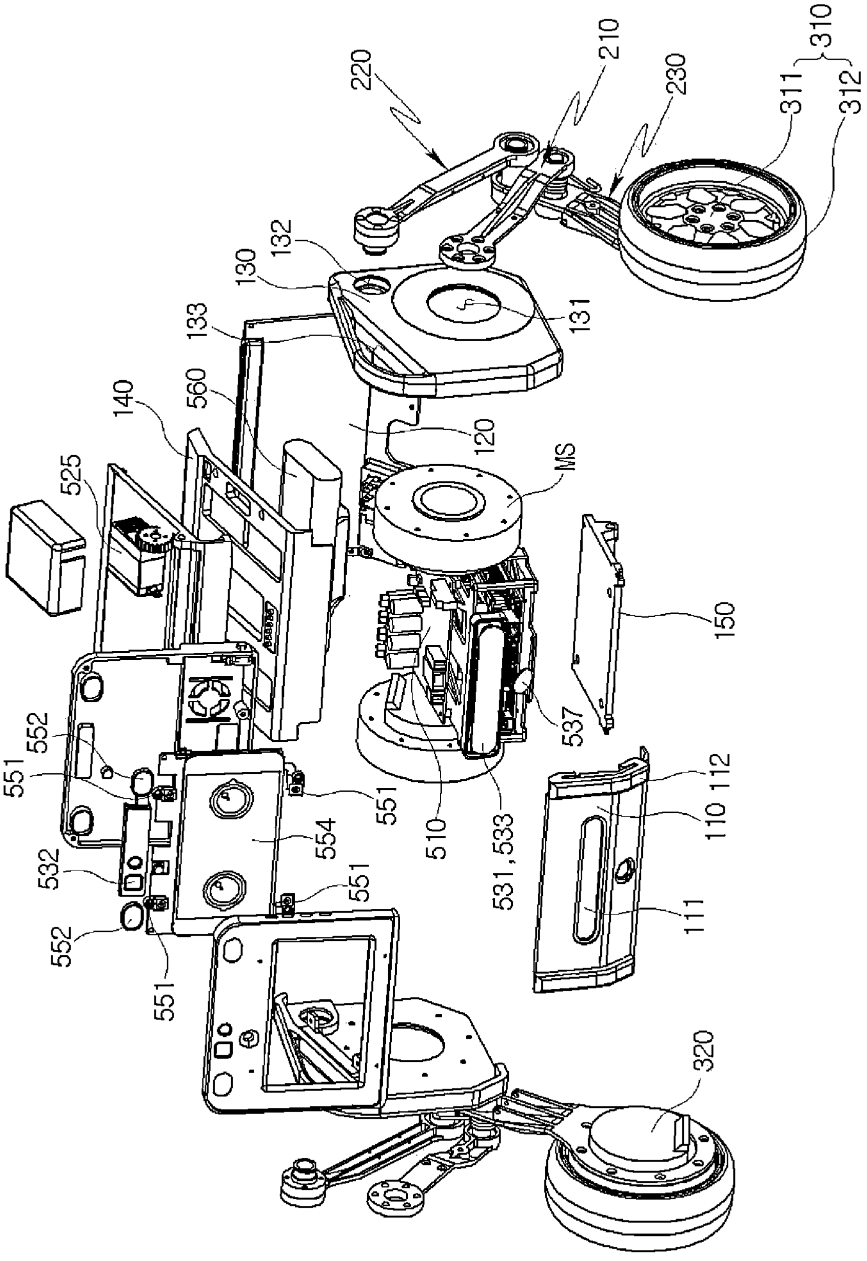

[FIG. 3]
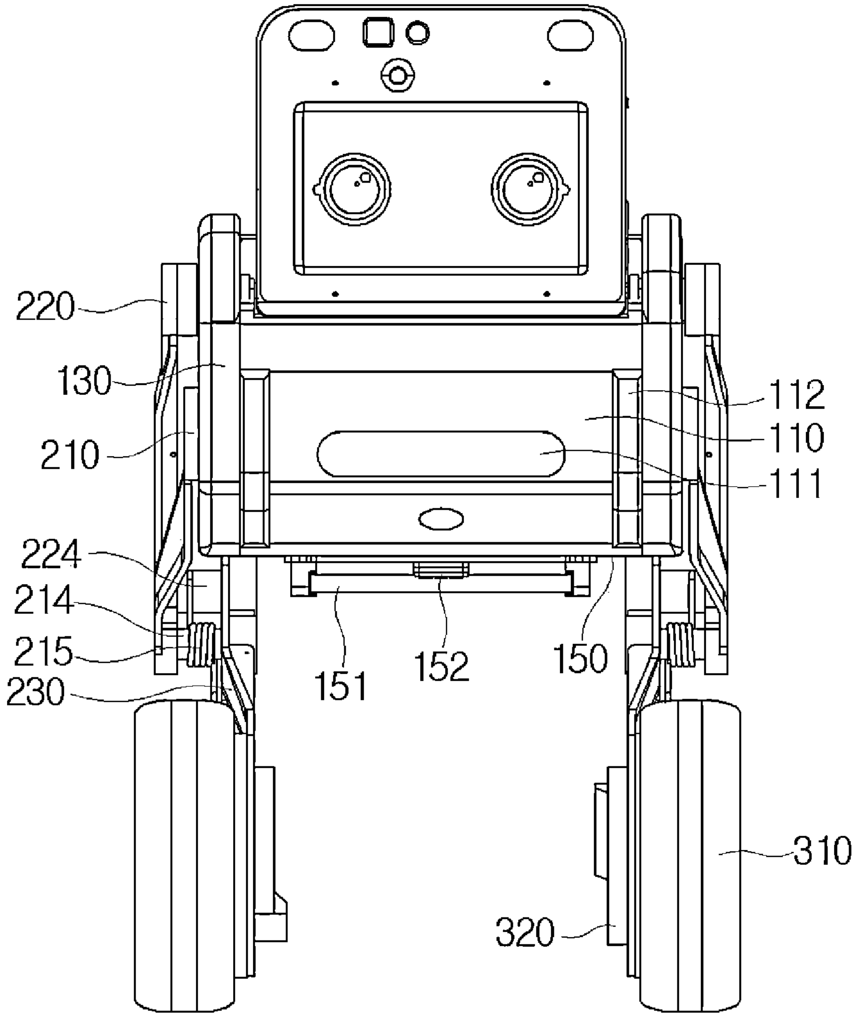

[FIG. 4]
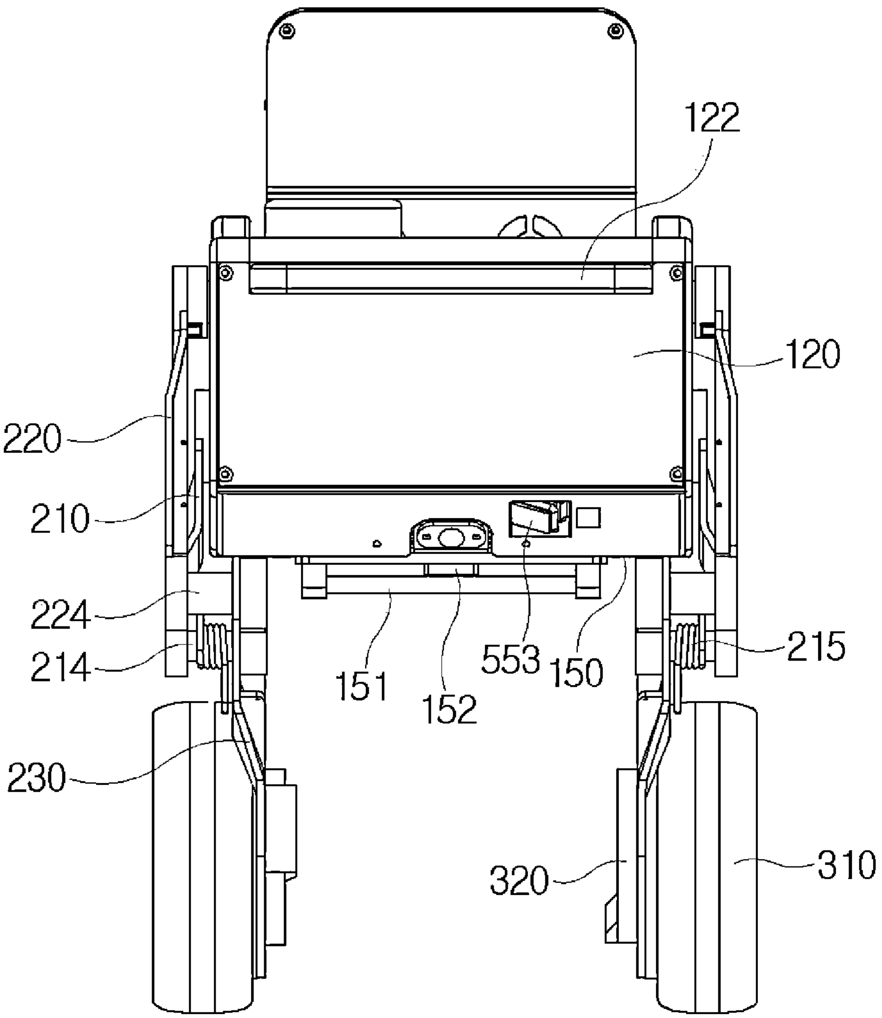

[FIG. 5]
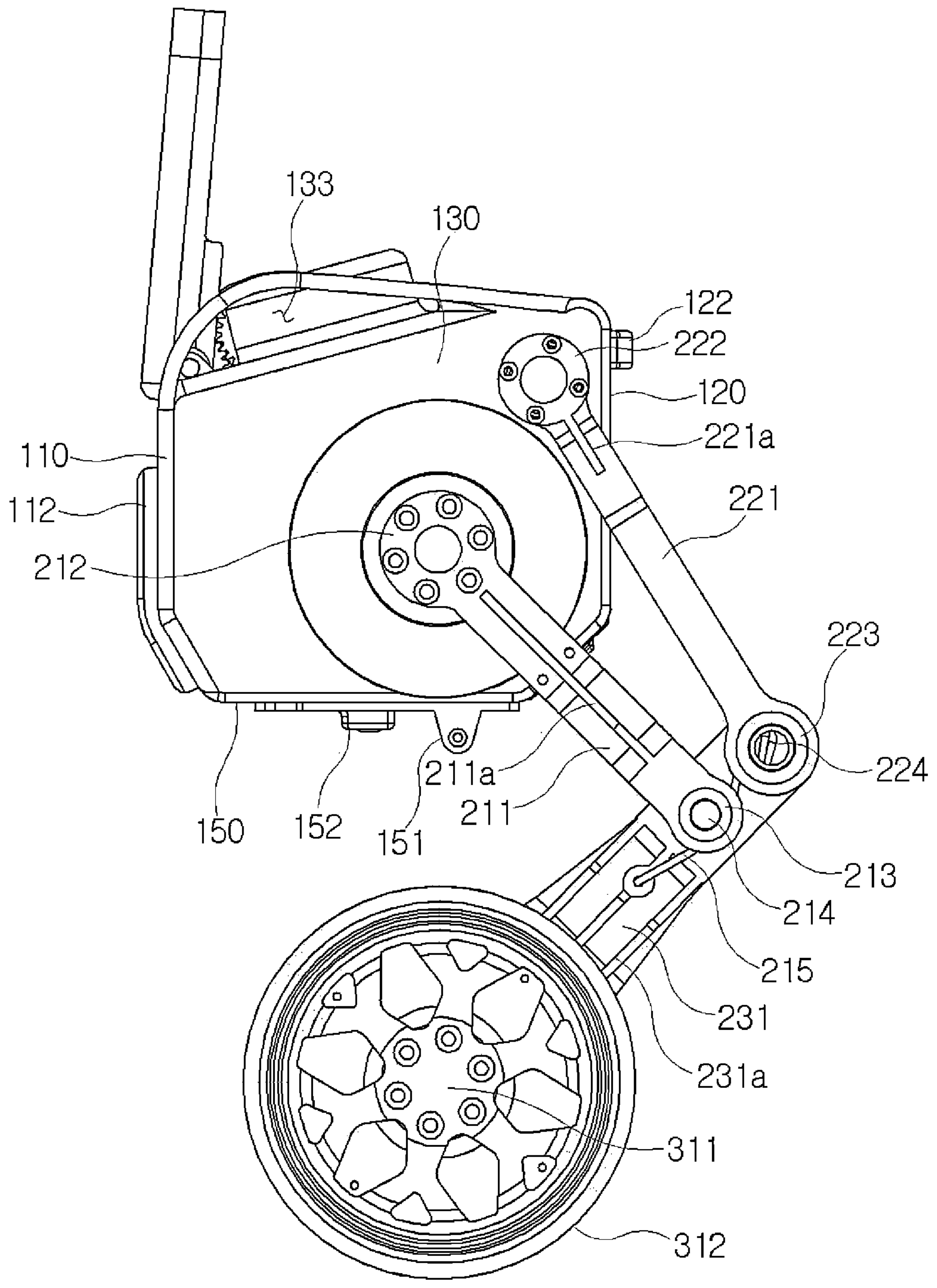

[FIG. 6]
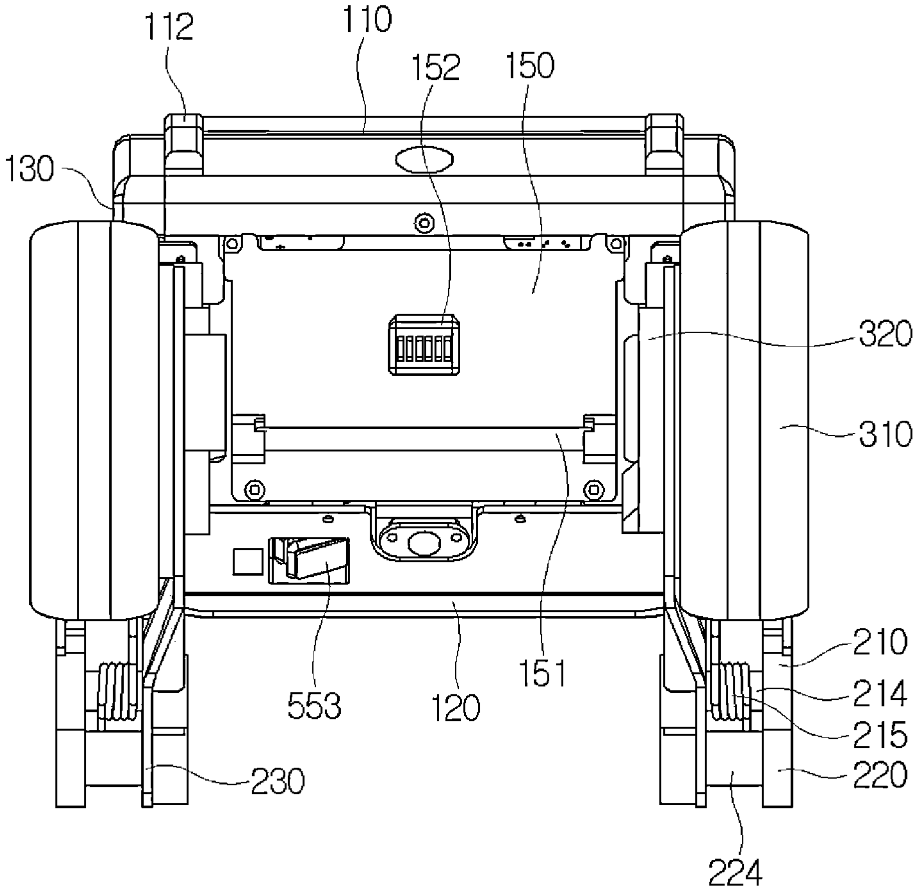

[FIG. 7]
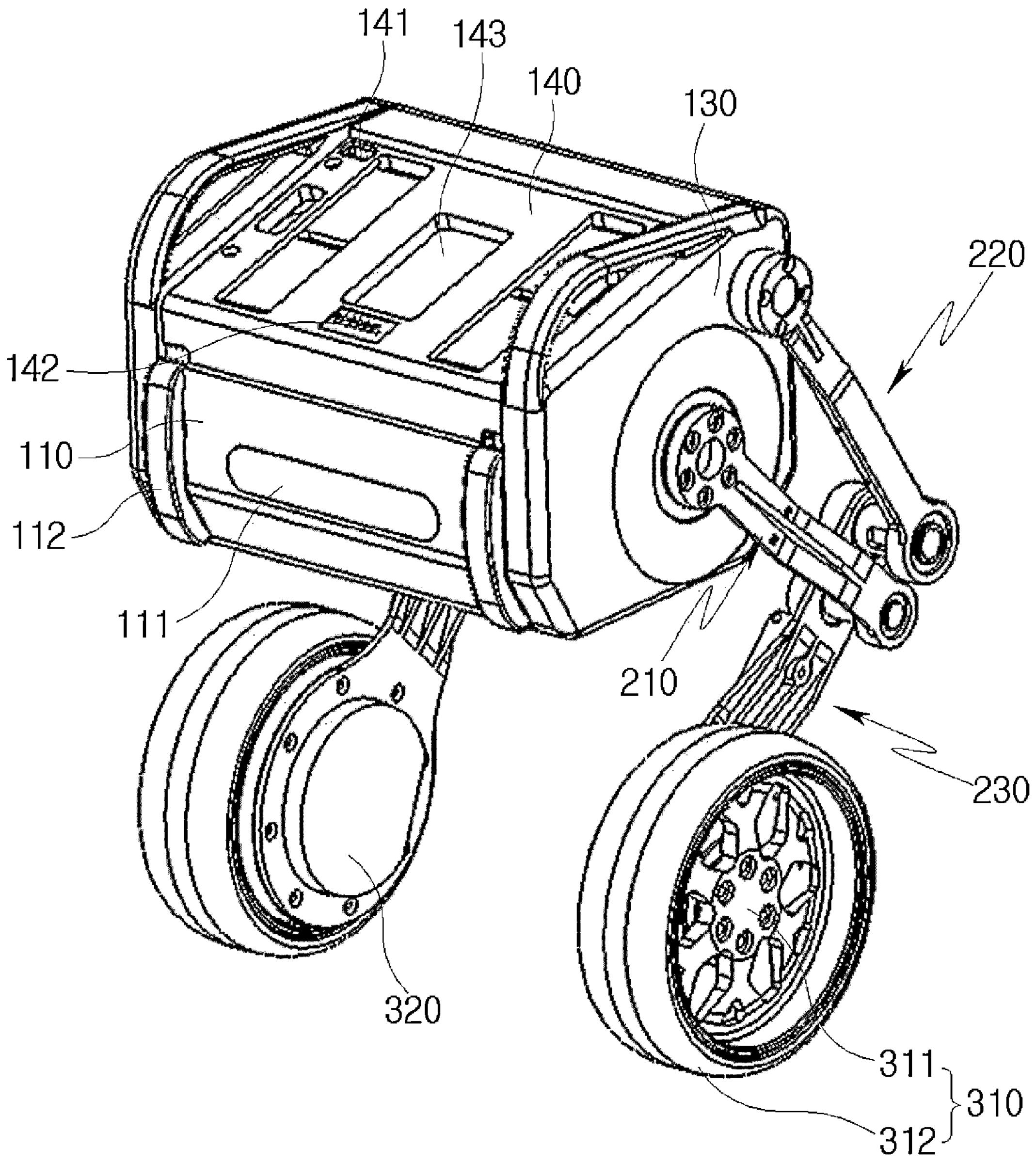

[FIG. 8]
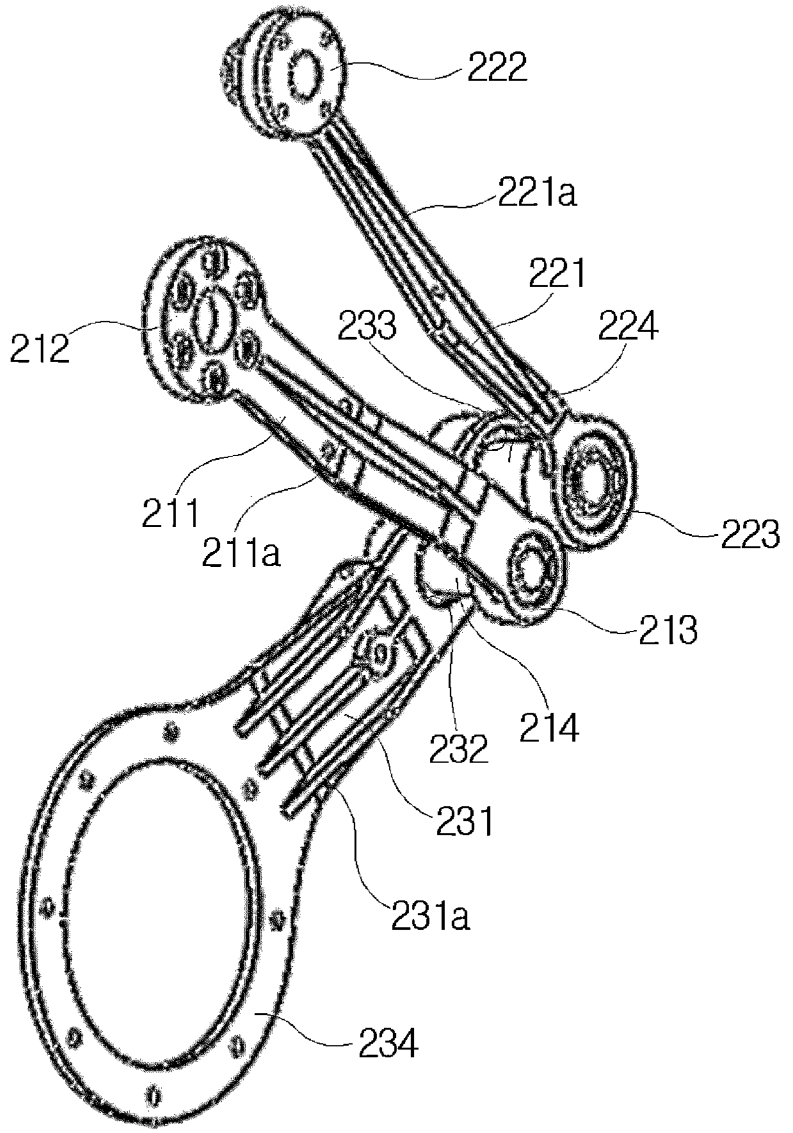

[FIG. 9]
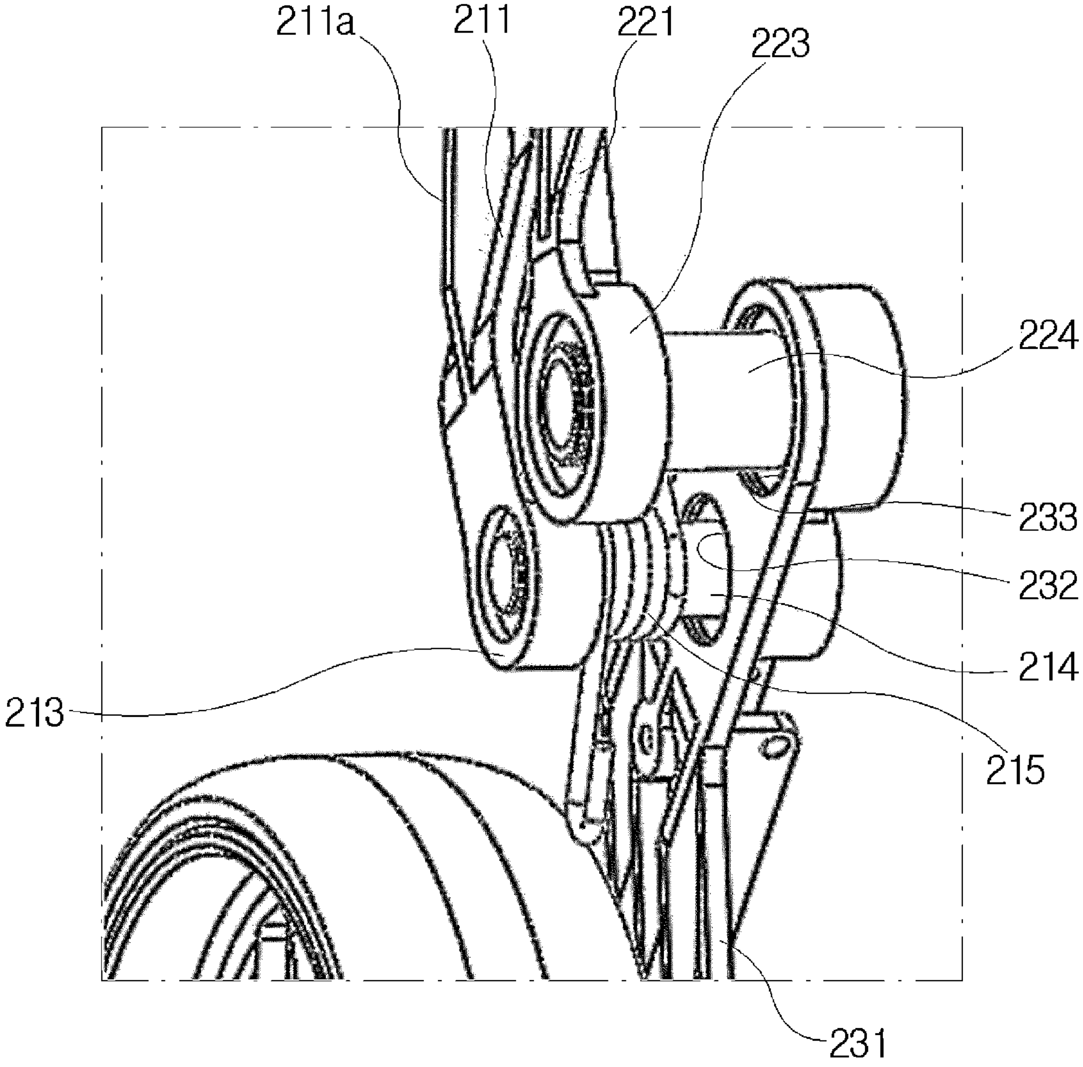

[FIG. 10]
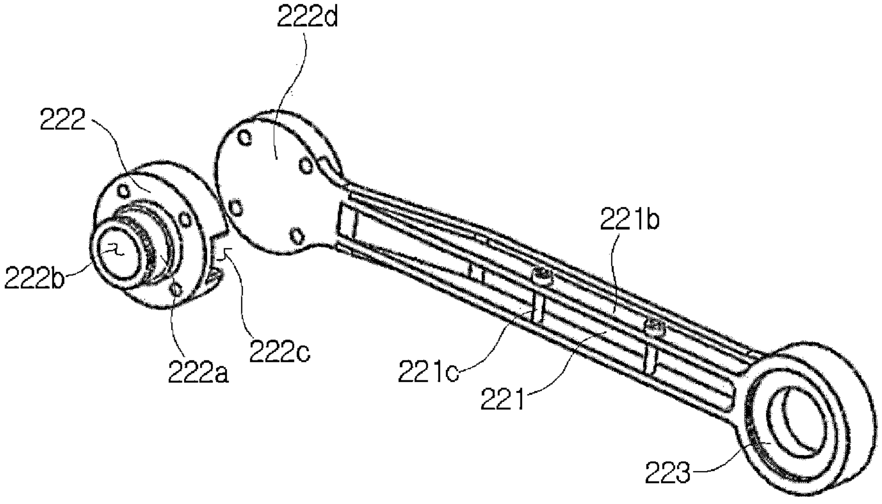

[FIG. 11]
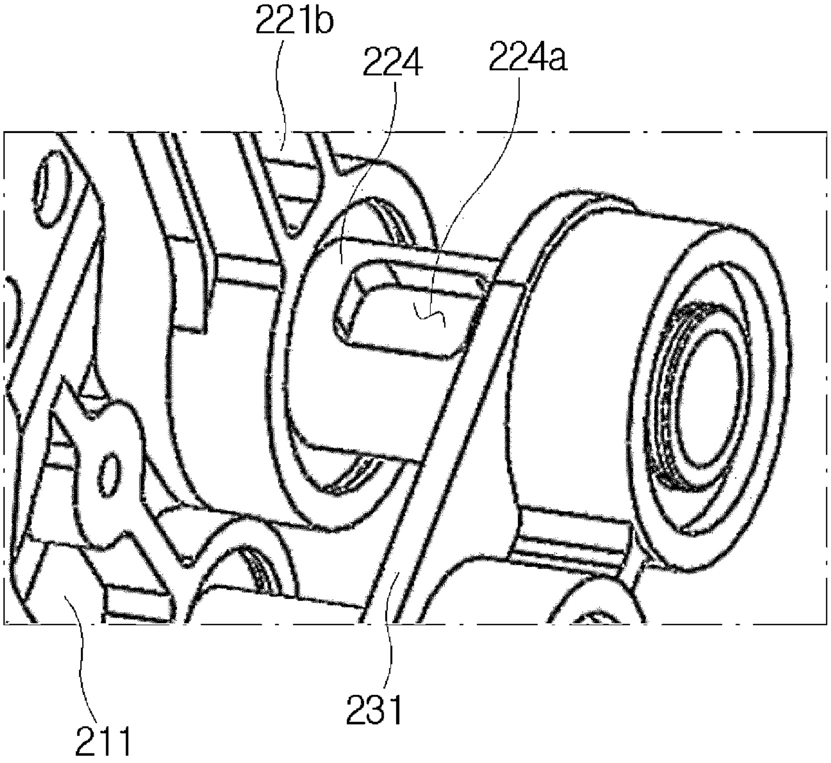

[FIG. 12]
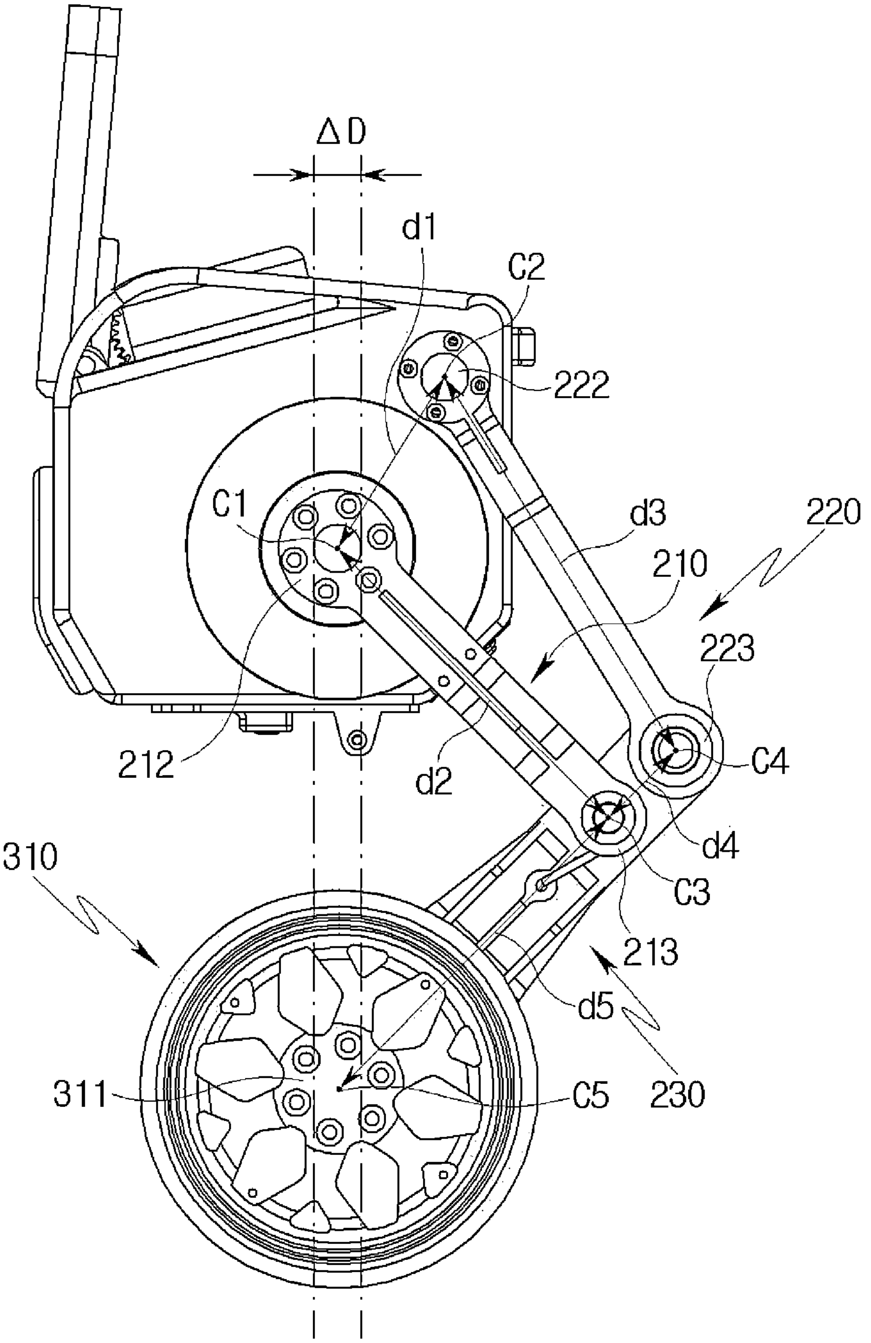

[FIG. 13]
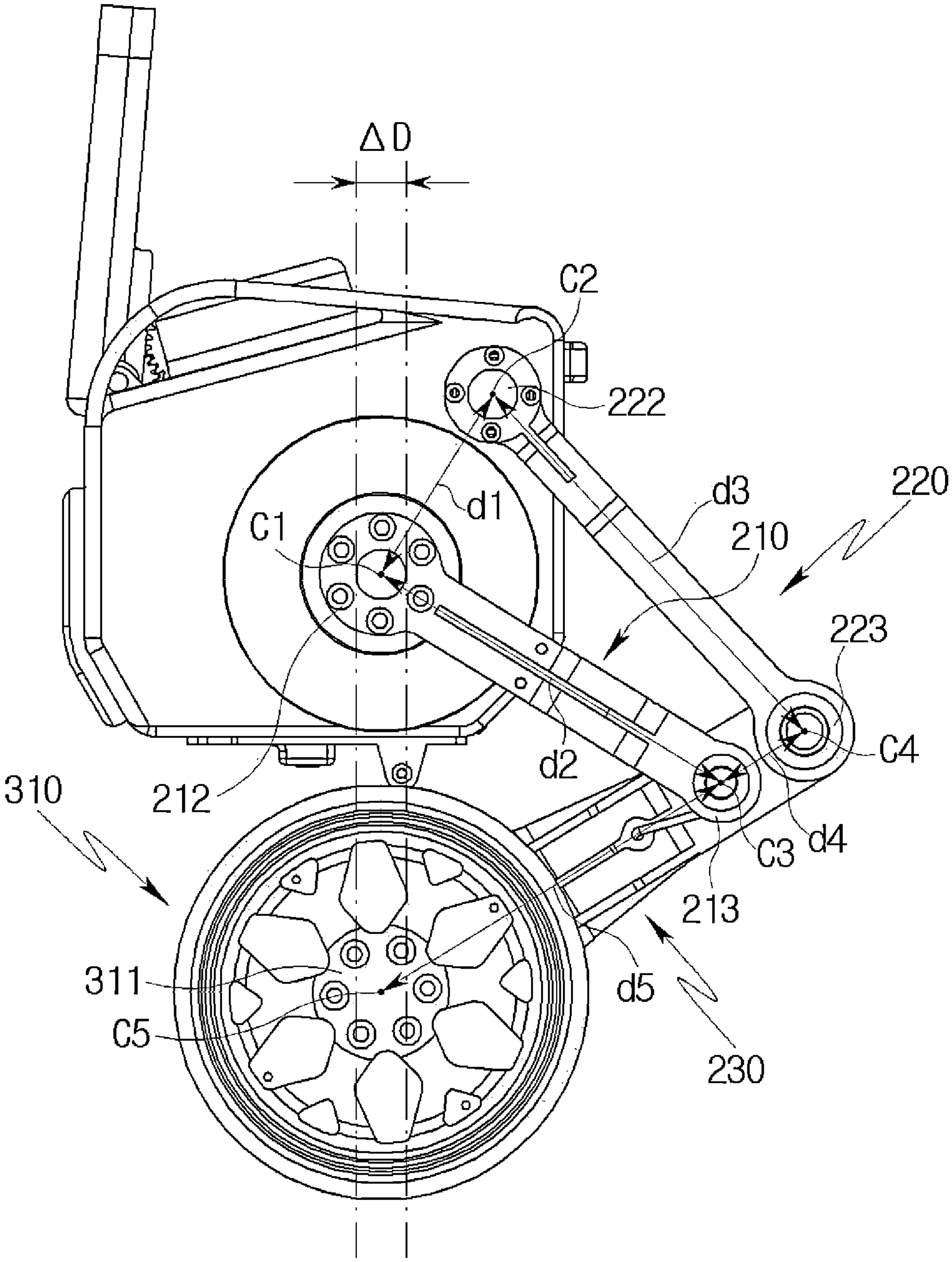

[FIG. 14]
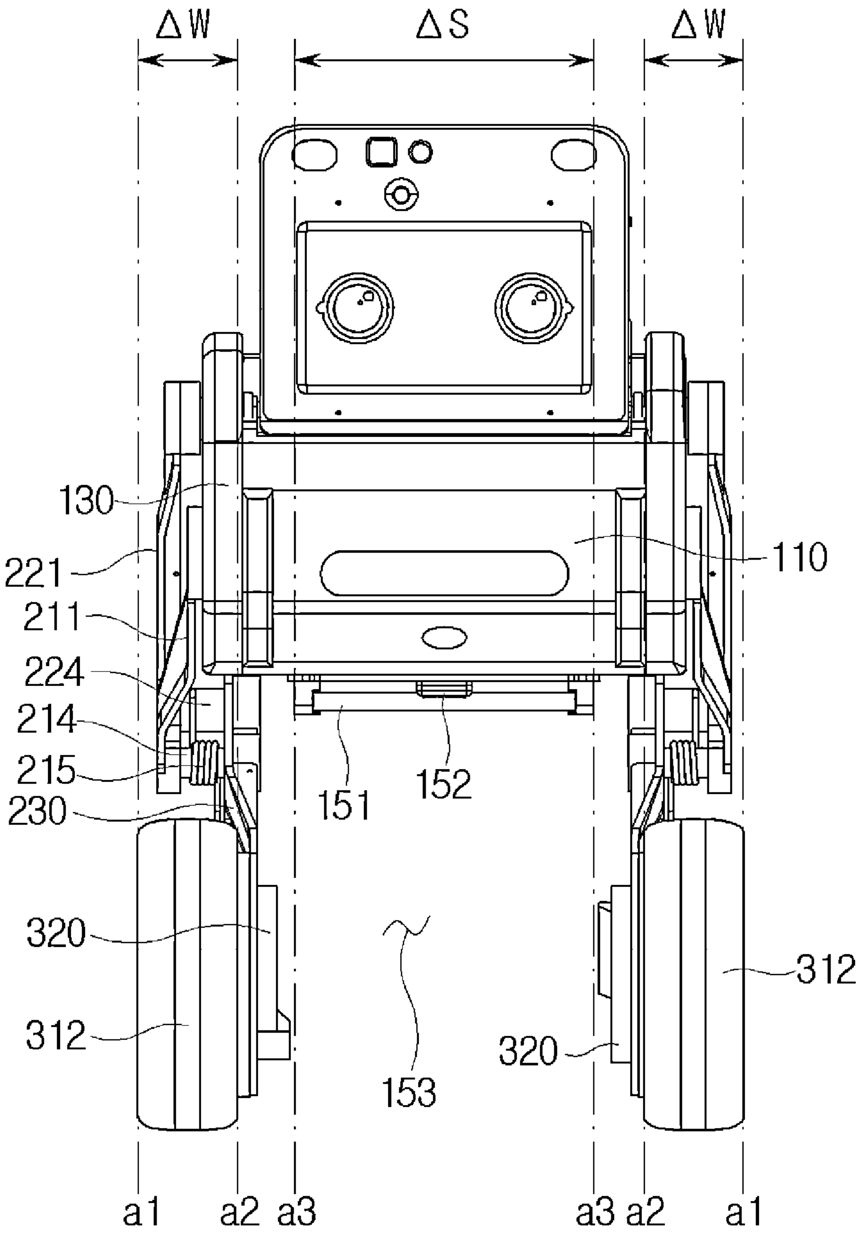

[FIG. 15]
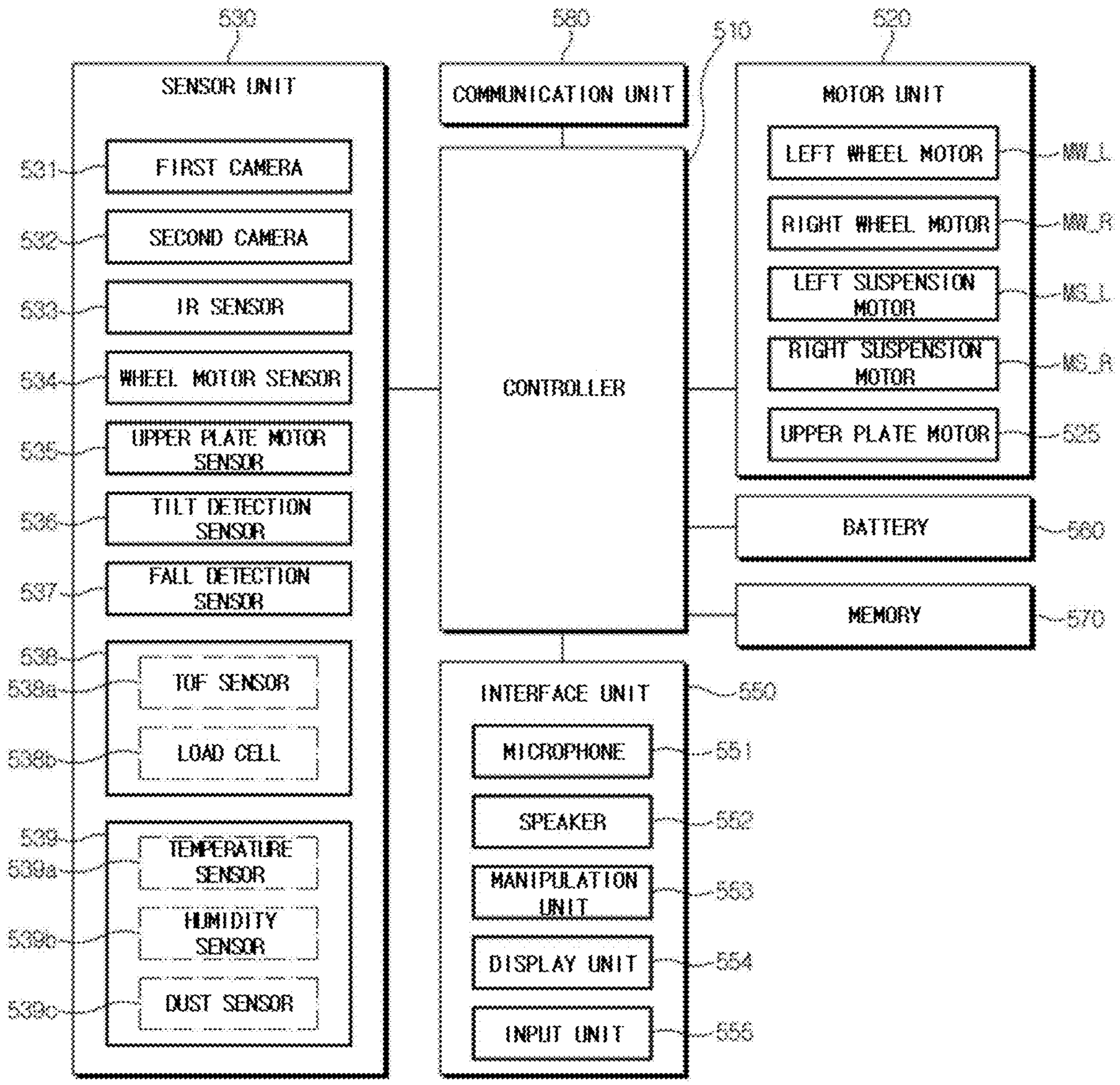

[FIG. 16]
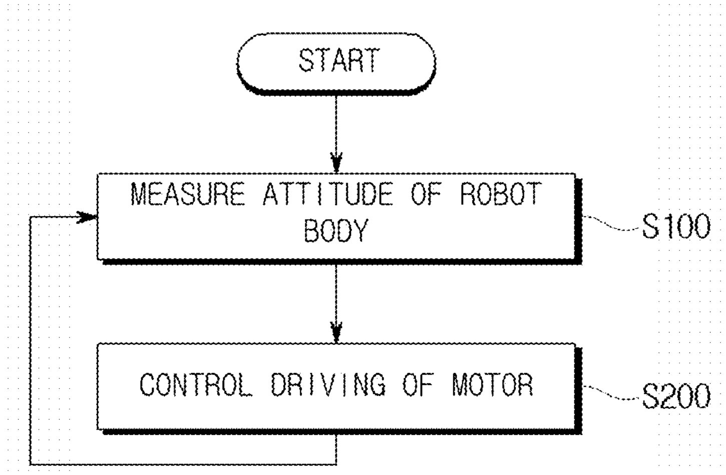

[FIG. 17]
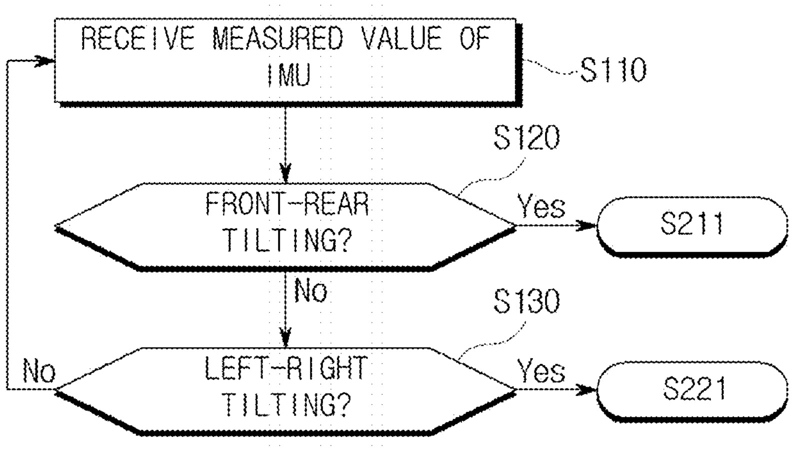

[FIG. 18]
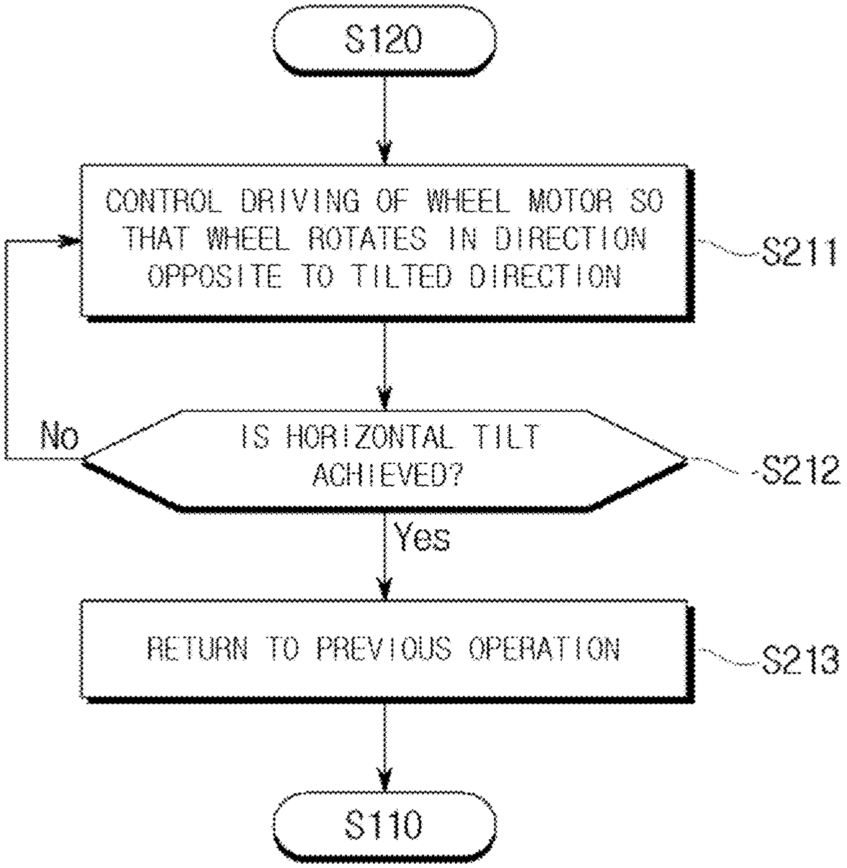

[FIG. 19]
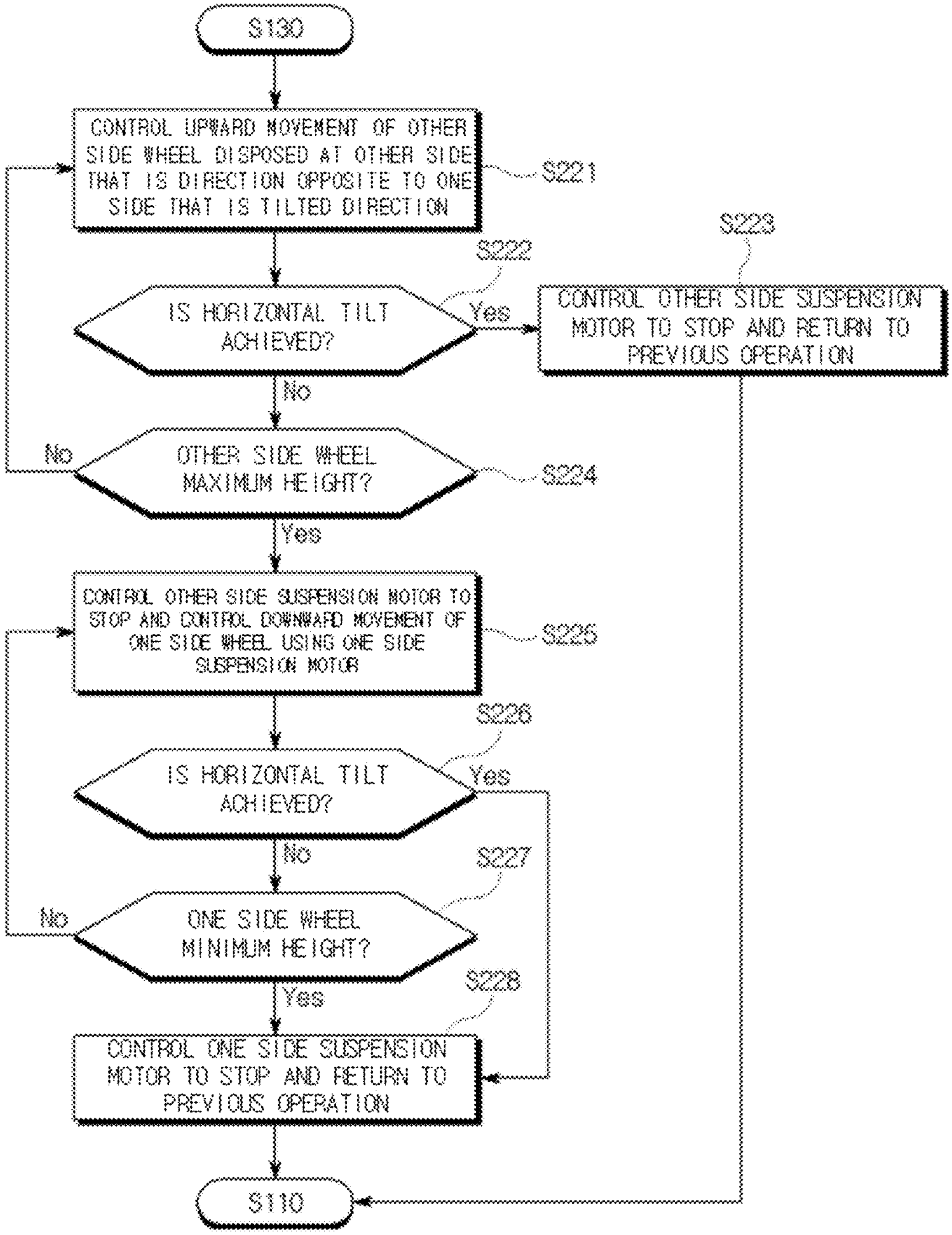

[FIG. 20a]
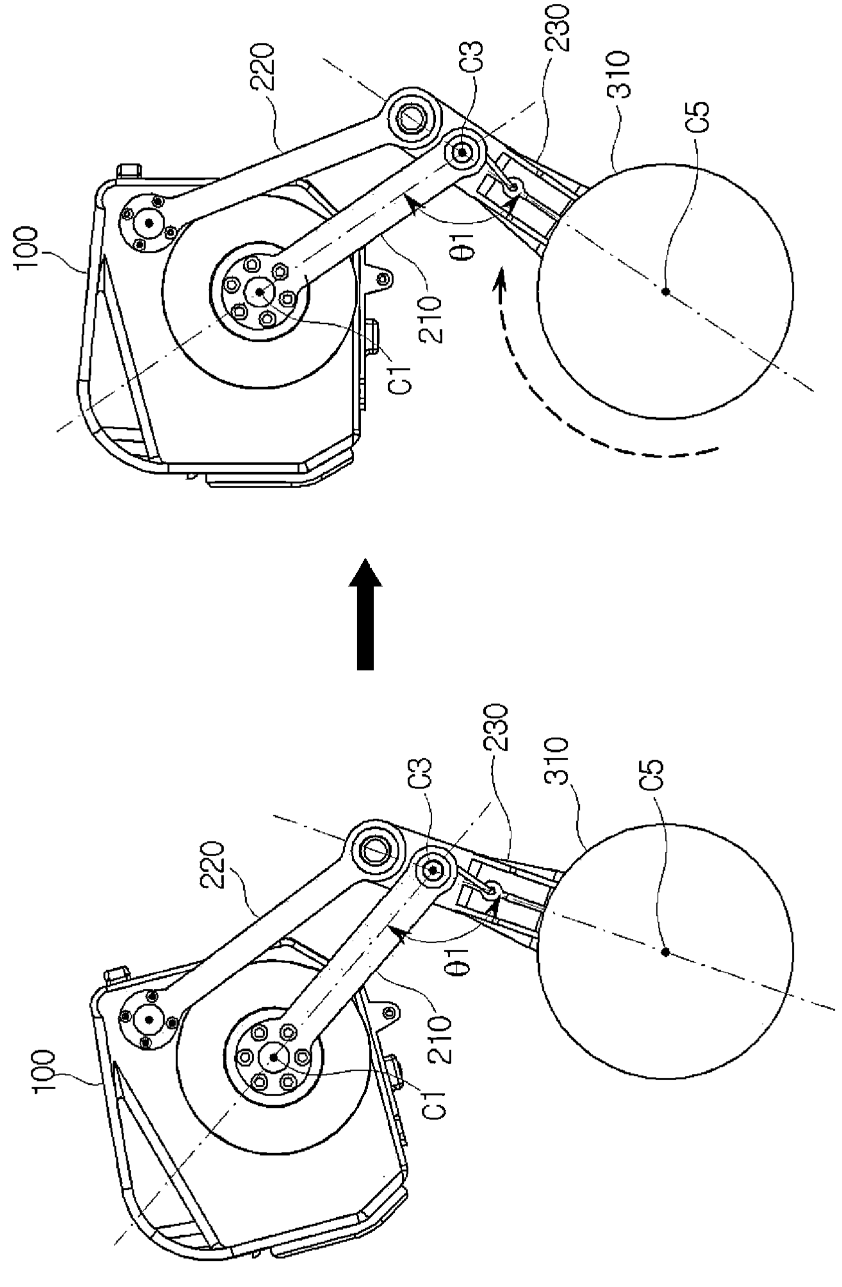

[FIG. 20b]
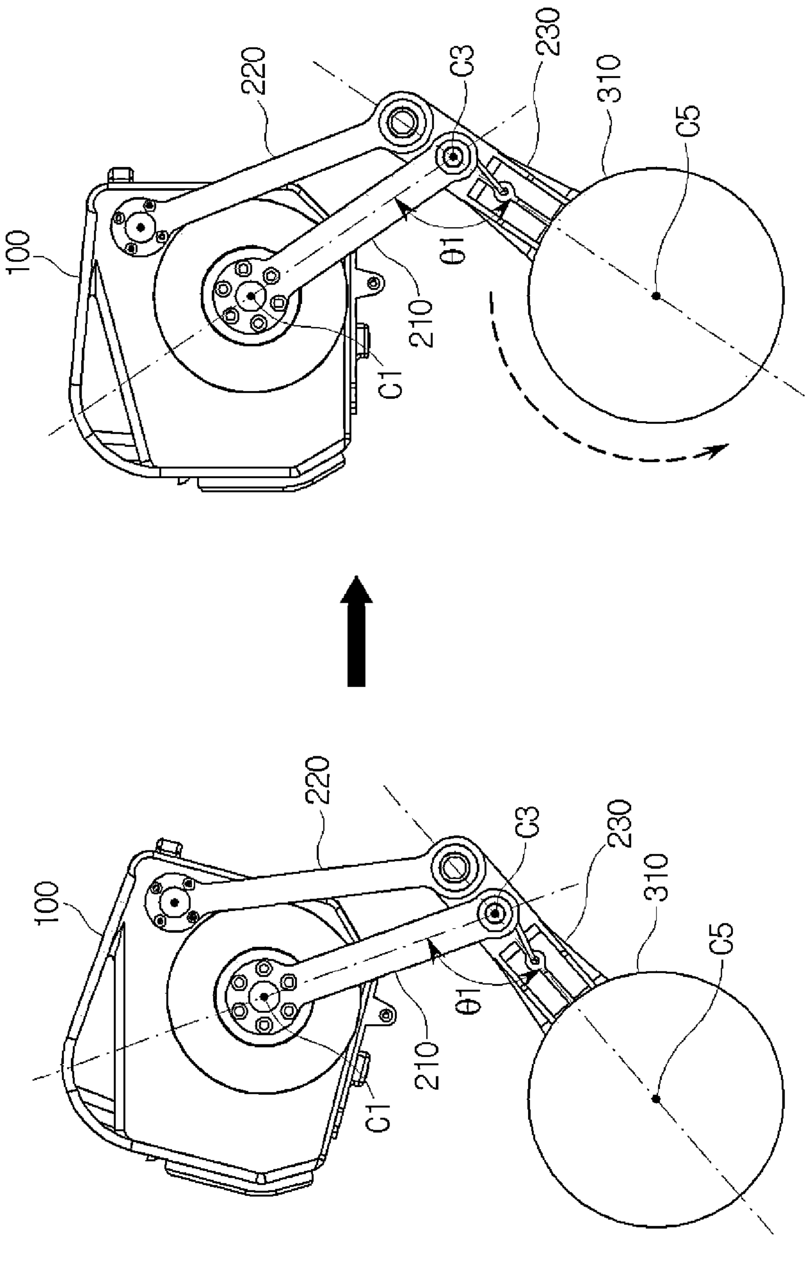

[FIG. 20c]
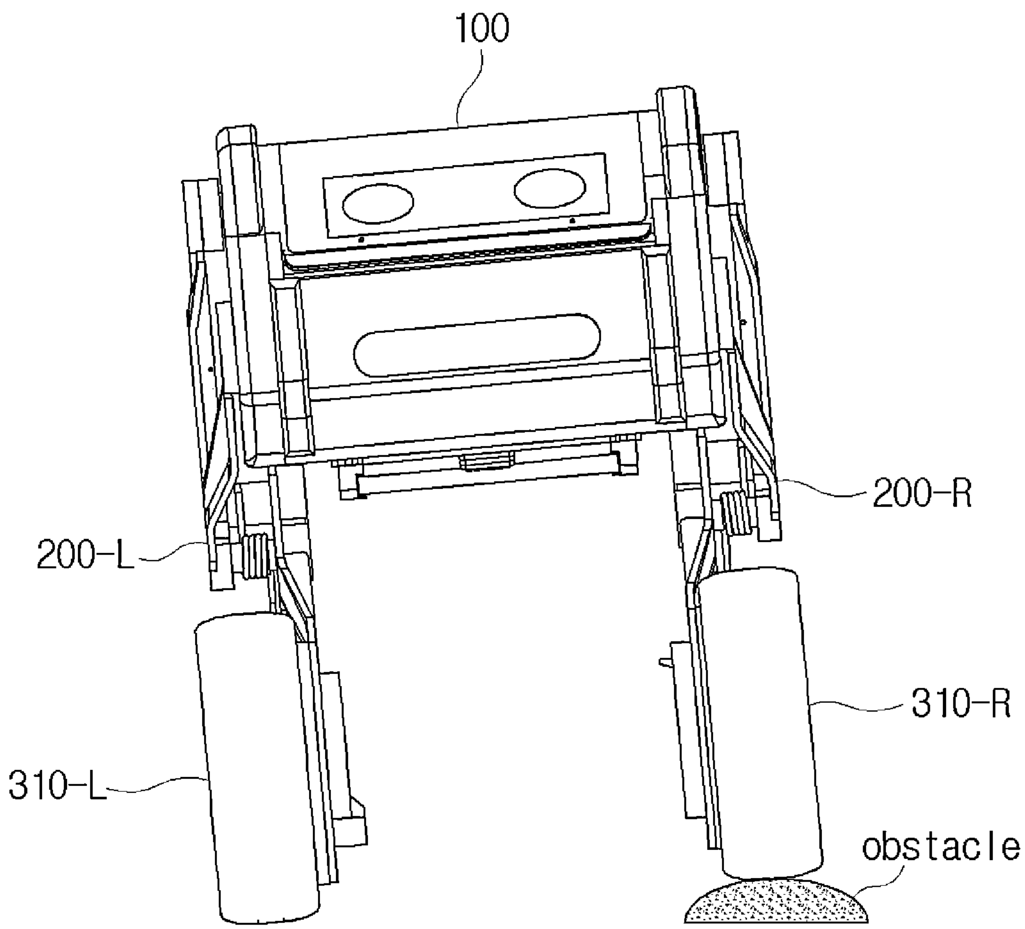

[FIG. 20d]
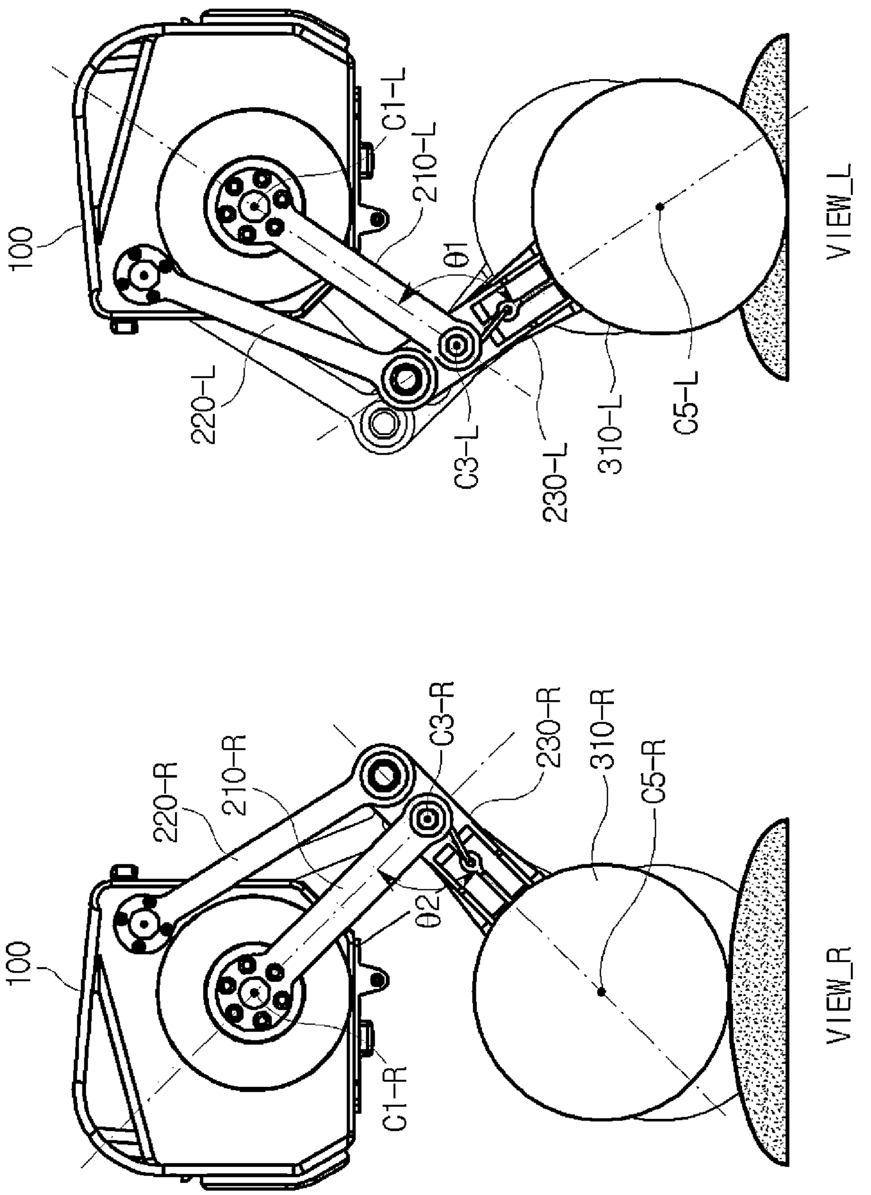

[FIG. 20e]
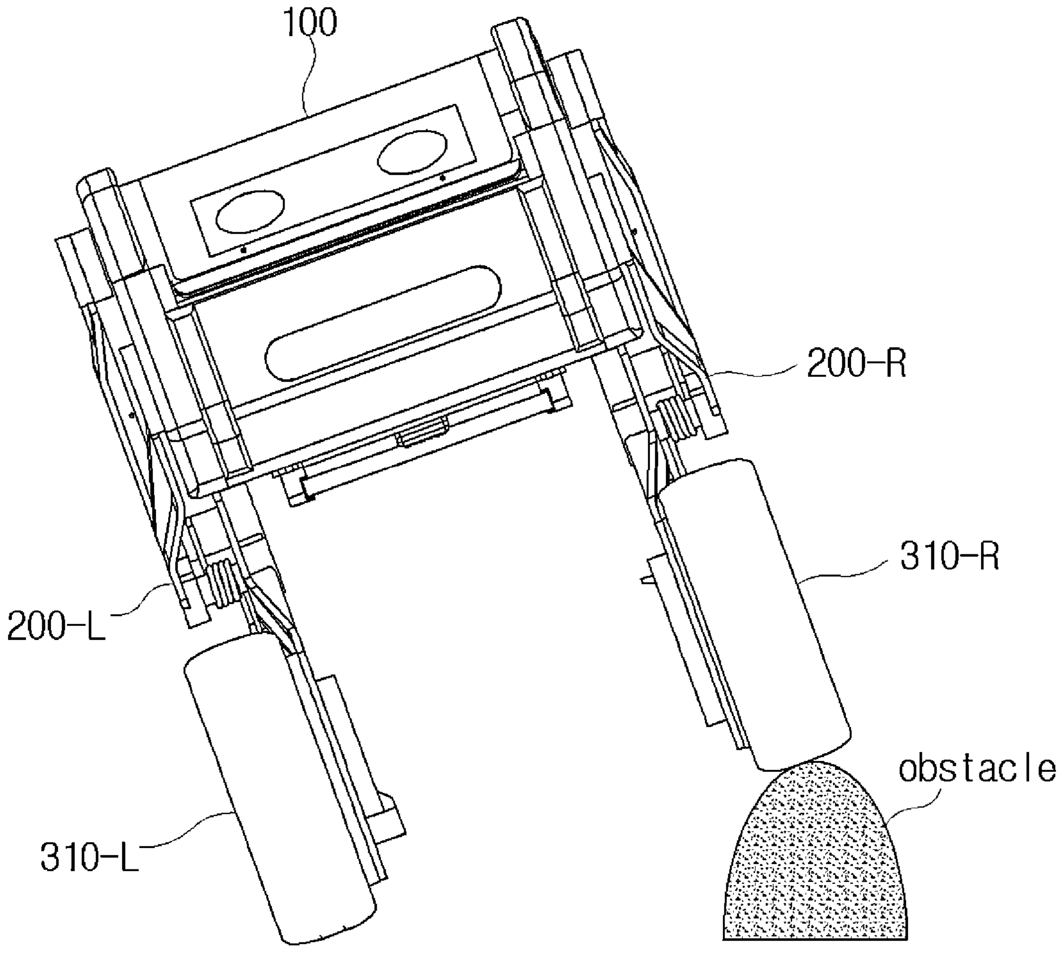

[FIG. 20f]
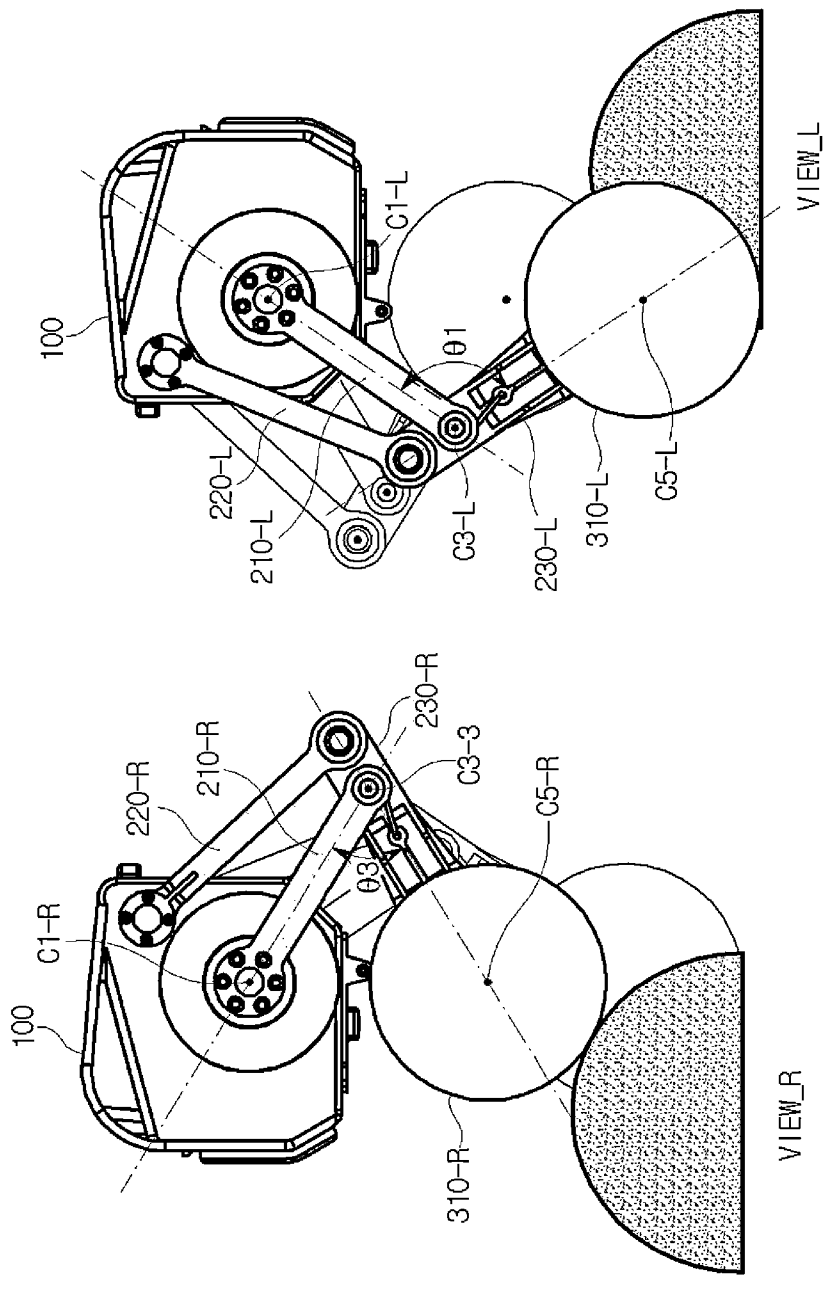

[FIG. 20g]
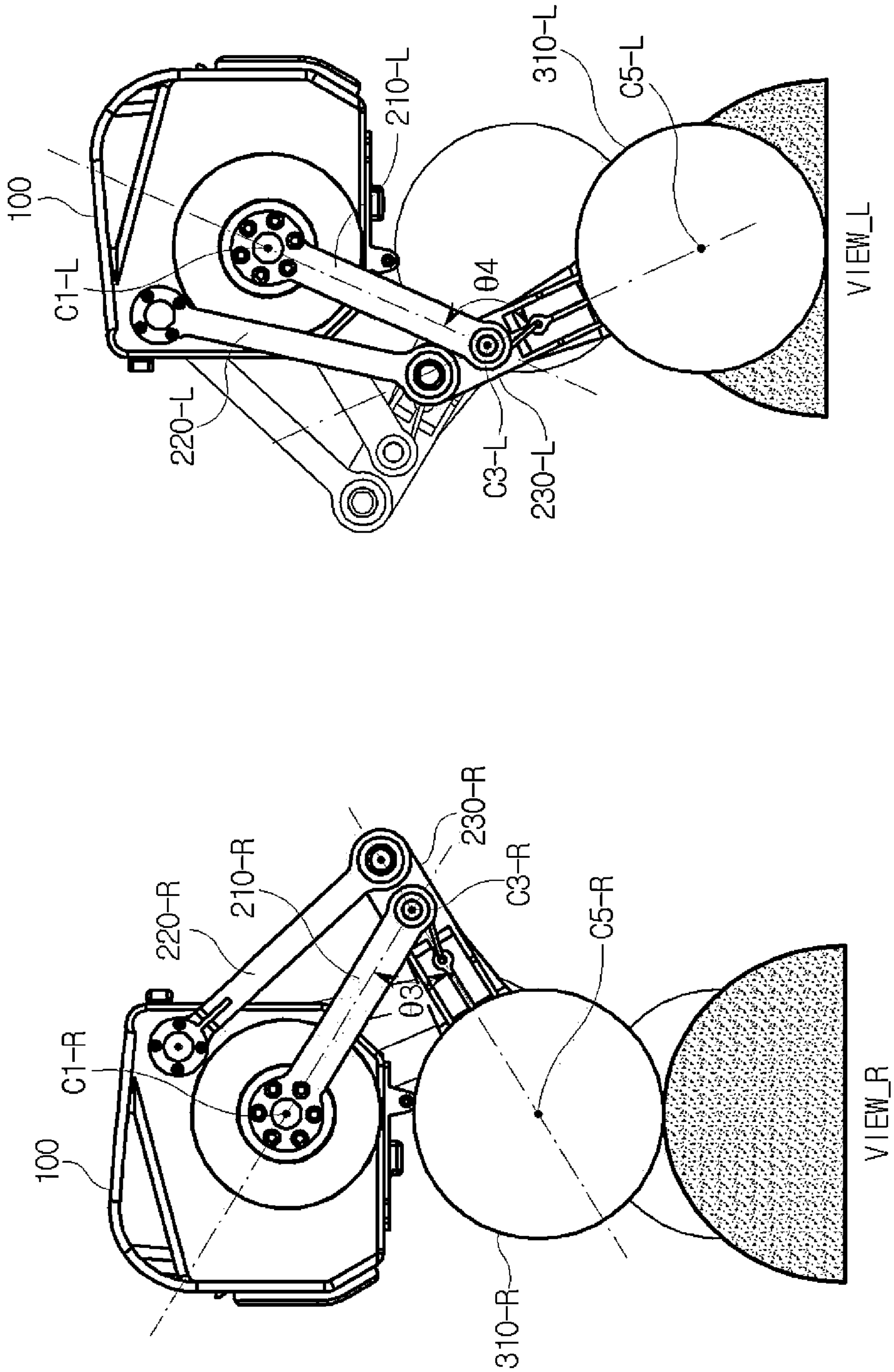

[FIG. 21]
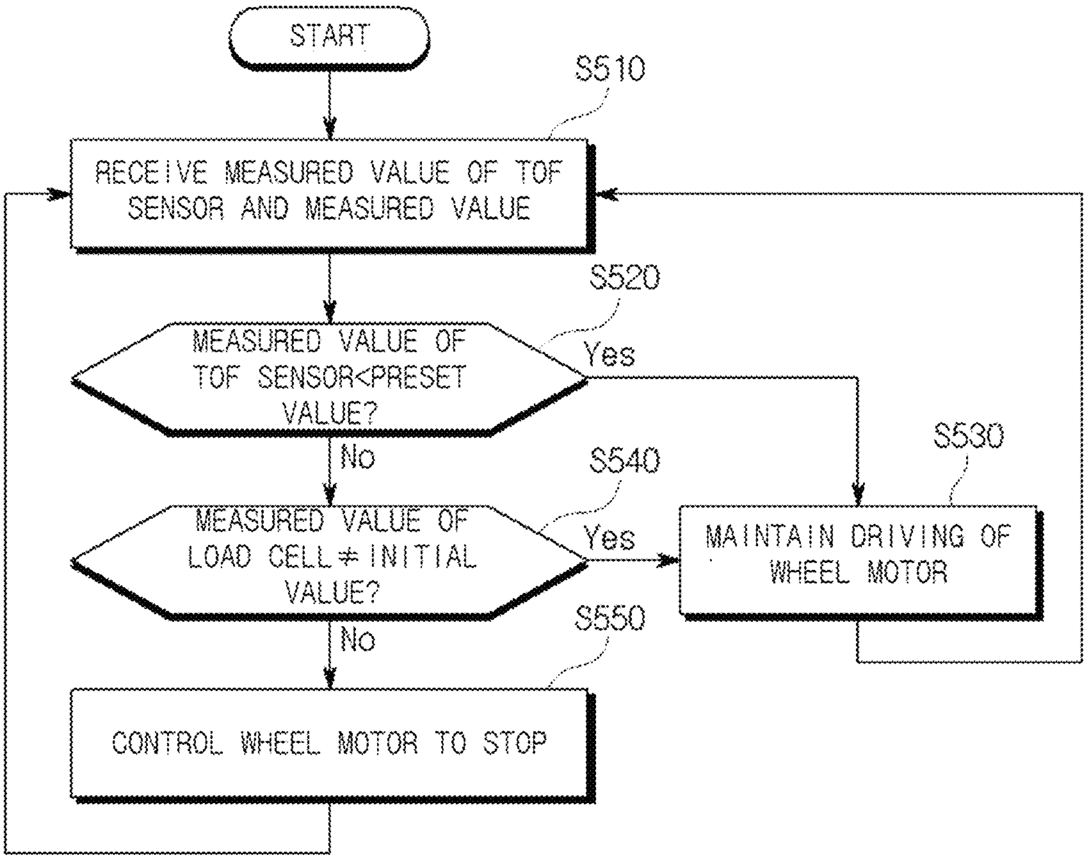

[FIG. 22]
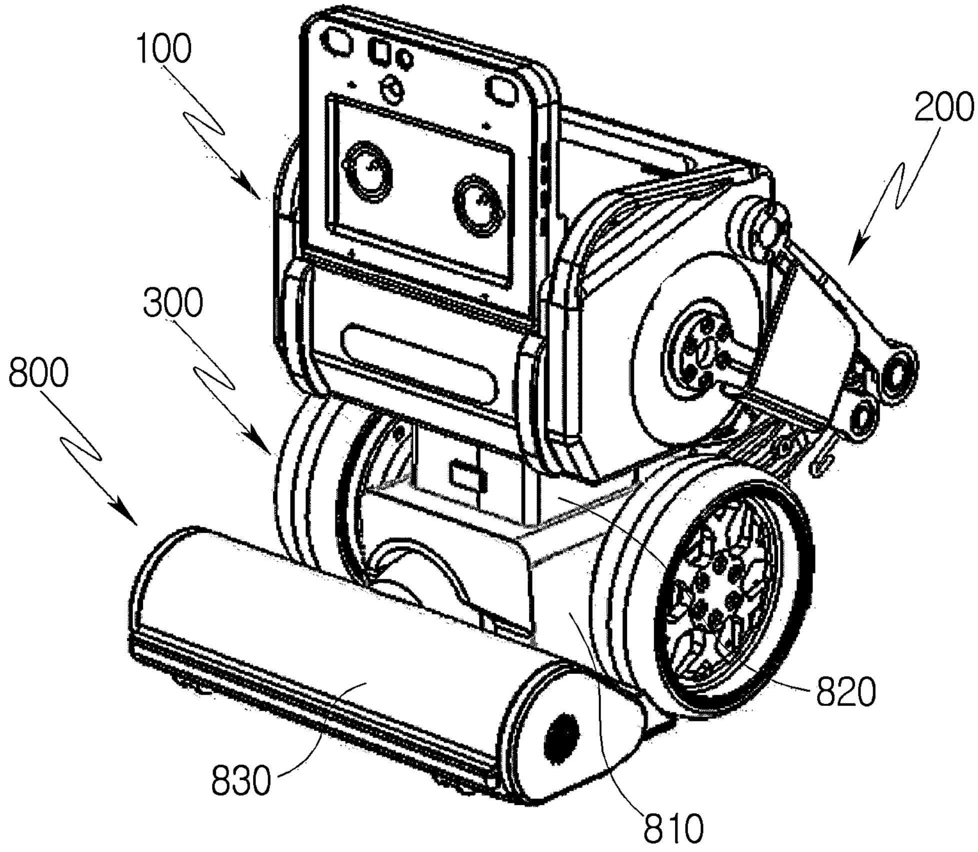

ROBOT AND METHOD OF CONTROLLING ROBOT

CROSS REFERENCE TO RELATED APPLICATIONS

This application is the National Phase of PCT International Application No. PCT/KR2023/002849, filed on Mar. 2, 2023, which claims priority under 35 U.S.C. 119(a) to Patent Application No. 10-2022-0030759, filed in the Republic of Korea on Mar. 11, 2022, all of which are hereby expressly incorporated by reference into the present application.

TECHNICAL FIELD

The present disclosure relates to a robot and a method of controlling the robot. More specifically, the present disclosure relates to a robot and a method of controlling the robot, in which even in various situations that cause the robot to tilt, a tilting angle of the robot body is maintained horizontally to prevent the robot from falling over or prevent objects placed on an upper portion of the robot from falling over.

BACKGROUND ART

Recently, various home robots are being developed for home automation (HA). A home robot can be defined as a robot for performing tasks that may occur at home on behalf of or as an assistant to a user.

One important function that the robot used at home perform to assist the user is to transport objects. For example, the user may command a robot located in a master bedroom to bring a mobile phone placed on an upper surface of a robot body to a living room. For example, the user may place a drink can or bottle taken out of a refrigerator on the upper surface of the robot body and then command the robot to deliver the same to another family member far away.

In this case, there are various obstacles such as door sills and electric wires in an internal environment of the home in which the robot travels. Therefore, in a structure capable of simply traveling only on a flat surface, there may occur a phenomenon that the robot body may tilt in a specific direction and shake when the robot performs the above-described object transport operation. When the robot body is tilted in a certain direction, the transport function is not performed properly, such as objects falling from the robot body and thus damaged, or drinks spilling.

Therefore, when the robot travels to transport objects, especially when climbing over obstacles, the horizontality of an upper module of the robot on which the object is placed needs to be maintained to prevent the transported object from falling over.

In addition, there is a possibility that the robot will wait for a long time in a state in which the object is placed on the upper module of the robot. Even when an unintended external force is applied to the robot in such a standby state, the horizontality of the upper module of the robot needs to be maintained to prevent the object from falling over.

In addition, since the robot should be able to travel in response to the user's commands at any time, the horizontality of the robot body needs to be maintained to prevent the robot from losing balance and falling over even in the standby state.

Meanwhile, unlike robots designated for specific purposes such as industrial or medical use, the robot used at home is a robot functioning as a pet or butler and is required to assist to the user while operating with a daily cycle similar to the user rather than frequently visiting a charging station for charging.

That is, it is preferable that the robot used at home travels or waits near the user to response to commands at any time when the user is awake, and to this end, the management of power consumed by the robot is also an important issue to resolve.

As Patent Document 1, Korean Patent Application Laid-Open No. 2018-0096078 is presented. Patent Document 1 relates to a modular home robot, and the robot disclosed in Patent Document 1 is composed of a main body and a device module, and device modules with different functions are provided to be replaced.

According to Patent Document 1, since device modules with various functions may be mounted on or separated from the main body, there is an advantage in providing functions desired by the user.

However, the robot in Patent Document 1 is a robot fixedly disposed indoors and has limited functions. That is, the robot cannot transport objects on behalf of the user and cannot provide a pet-like feeling due to having no mobility.

As Patent Document 2, Korean Patent No. 2358003 is presented. Patent Document 2 relates to a delivery management robot system, and one embodiment of the robot disclosed in Patent Document 2 is a loading robot for transporting laundry. The loading robot includes a body, an arm unit, a leg unit, a sensor unit, etc., and the arm unit is provided with a movement prevention unit formed to be bent in a "]" shape to support a vertex and some of corners of a laundry box.

According to Patent Document 2, a shape of the movement prevention unit tailored to a shape of the laundry box can prevent the movement of the laundry box even when the loading robot moves.

However, the loading robot of Patent Document 2 has a limitation in that only standardized boxes may be transported by being supported by the movement prevention unit, and only these types of boxes can have the movement prevention effect. In addition, Patent Document 2 merely discloses that the leg unit of the loading robot moves in all directions and does not present any solution in relation to its shape or maintaining a horizontal attitude while traveling.

As Patent Document 3, US Patent Publication No. 2020-0306998 is presented. Patent Document 3 discloses a robot that moves using a pair of legs provided with wheels.

The robot of Patent Document 3 includes an arm configured to grip an object and a pair of legs connected to drive wheels to move, and a torque and axial force of the drive wheel are controlled by data processing hardware.

According to Patent Document 3, the data processing hardware is configured to receive movement restrictions (such as restriction on collision with front obstacles) while the arm is gripping an object and control the drive wheel within a range that satisfies the same, thereby not interfering with the arm's grip on the object.

However, in the robot in Patent Document 3, to maintain balance while traveling or stopping, the body to which the legs are coupled is rotated in a pendulum shape, and balance is maintained by rotating a counter-balance in response to the rotation of the body. Therefore, the mobile robot has a limitation in that the body shakes in a vertical direction while maintaining balance. Therefore, there is a limitation in that the robot cannot transport the object through the body rather than a separate arm.

DISCLOSURE

Technical Problem

The present disclosure is directed to providing a robot and a method of controlling the robot, which enable horizontal control of attitude.

In addition, the present disclosure is directed to providing a robot and a method of controlling the robot, which can save battery power consumed for attitude horizontal control.

In addition, the present disclosure is directed to providing a robot and a method of controlling the robot, which may detect whether a wheel is in contact with the ground.

Technical Solution

To achieve the objects, a robot according to at least one embodiment of the present disclosure may include a robot body in which a battery is accommodated, a leg unit coupled to each of left and right surfaces of the robot body, a wheel unit rotatably coupled to each leg unit and including a wheel rolling along a ground, a suspension motor accommodated in the robot body and connected to each of the left and right leg units to provide a driving force to the leg unit, and a wheel motor accommodated in the wheel unit and connected to provide a driving force to the wheel.

In the robot according to at least one embodiment of the present disclosure, when the robot body is tilted forward or backward compared to a preset horizontal tilt, the wheel motors disposed at left and right sides of the robot body may be simultaneously driven.

In the robot according to at least one embodiment of the present disclosure, when the robot body is tilted leftward or rightward compared to a preset horizontal tilt, the suspension motors disposed at the left and right sides of the robot body may be sequentially driven, or any one of the suspension motors may be driven.

In the robot according to at least one embodiment of the present disclosure, when the tilted direction of the robot body is forward, driving of the wheel motor may be controlled so that the wheel rotates backward.

In the robot according to at least one embodiment of the present disclosure, when the tilted direction of the robot body is backward, driving of the wheel motor may be controlled so that the wheel rotates forward.

In the robot according to at least one embodiment of the present disclosure, when the tilted direction of the robot body is leftward or rightward, driving of a suspension motor disposed at an other side, which is a direction opposite to a one side of the tilted direction, may be first controlled.

In the robot according to at least one embodiment of the present disclosure, only when the preset horizontal tilt is not achieved, driving of a suspension motor disposed at the one side may be controlled after the driving of the suspension motor disposed at the other side is finished.

In the robot according to at least one embodiment of the present disclosure, the leg unit may include a first link link-connected to a side surface of the robot body and connected to the suspension motor, a second link link-coupled to the side surface of the robot body to which the first link is coupled, and a third link link-coupled to the first link and the second link and coupled to the wheel unit.

In the robot according to at least one embodiment of the present disclosure, when the tilted direction of the robot body is leftward or rightward, the driving of the suspension motor disposed at the other side, which is a direction opposite to the one side that is the tilted direction, may be controlled and controlled so that an angle between the first link and the third link that are disposed at the other side decreases.

In the robot according to at least one embodiment of the present disclosure, when the horizontal tilt is not achieved in a state in which an angle between the second link and the third link that are disposed at the other side decreases to a preset minimum critical angle, the driving of the suspension motor disposed in the one side direction that is the tilted direction may be controlled so that the angle between the first link and the third link that are disposed at the one side increases.

In the robot according to at least one embodiment of the present disclosure, when the preset horizontal tilt is not achieved in a state in which the angle between the first link and the third link that are disposed at the one side is a preset maximum critical angle and the angle between the first link and the third link that are disposed at the other side is the minimum critical angle, the driving of the robot body may be controlled so that the maximum critical angle and the minimum critical angle are maintained.

In the robot according to at least one embodiment of the present disclosure, the robot may further include a tilt detection sensor disposed on the robot body to detect a tilting degree of the robot body.

In the robot according to at least one embodiment of the present disclosure, when the wheel is spaced apart from a ground, the driving the wheel motor may be stopped regardless of the tilting degree of the robot body.

In the robot according to at least one embodiment of the present disclosure, the robot may further include a contact detection sensor configured to detect a state in which the wheel is in contact with the ground.

In the robot according to at least one embodiment of the present disclosure, the contact detection sensor may include a time of flight (TOF) sensor disposed on the wheel unit to measure a distance to the ground, and a load cell disposed on the leg unit to detect a normal force received by the leg unit from the ground.

To achieve the objects, a method of controlling a robot according to at least one embodiment of the present disclosure may include an attitude measuring operation of measuring a tilted direction and a tilt value compared to a preset horizontal tilt of the robot, and a motor driving operation of driving a suspension motor connected to the leg unit or a wheel motor connected to the wheel according to the tilted direction.

In the method of controlling the robot according to at least one embodiment of the present disclosure, the motor driving operation may include, when the tilted direction of the robot body is leftward or rightward, sequentially driving suspension motors disposed at left and right sides of the robot body or driving any one of the suspension motors.

In the method of controlling the robot according to at least one embodiment of the present disclosure, the motor driving operation may include, when the tilted direction of the robot body is forward or backward, controlling driving of the wheel motor so that the wheel rotates in a direction opposite to the tilted direction.

In the method of controlling the robot according to at least one embodiment of the present disclosure, the motor driving operation may include increasing a wheel disposed at the other side by controlling driving of a suspension motor disposed at the other side, which is a direction opposite to one side that is the tilted direction when the tilted direction of the robot body is leftward or rightward, controlling the driving of the suspension motor disposed at the other side to stop when the wheel disposed at the other side moves upward to a preset maximum height in a state in which the horizontal tilt is not achieved, and moving a wheel disposed at one side downward by controlling driving of a suspension motor disposed at the one side, and controlling the driving of the suspension motor disposed at the one side to stop when the wheel disposed at the one side moves downward to a preset minimum height in the state in which the horizontal tilt is not achieved.

Advantageous Effects

According to the present disclosure, the robot can be configured to control the driving of the motor wheel and/or the suspension wheel according to the tilting direction and degree of the robot body, thereby enabling the attitude horizontal control.

Therefore, since the horizontality of the robot body is maintained while traveling indoors, the robot can safely transport the object. In addition, there is an advantage that the robot can wait anywhere at home by continuously correcting its attitude even when waiting for the user command in a stationary attitude and immediately response to the user command at any time.

In addition, according to the present disclosure, since the robot is configured to sequentially or selectively control the left and right suspension motors without controlling the same at the same time when the left and right tilt of the robot body is corrected, it is possible to save battery power.

Therefore, it is possible to delay the discharging speed of the battery, thereby preventing the frequency charging of the robot. Therefore, there is an advantage in that the robot can assist to the user while operating with the daily cycle similar to the user.

In addition, according to the present disclosure, by constituting the contact detection sensor to detect whether the wheel is in contact with the ground, the robot can easily maintain balance without falling over even when the user lifts the robot and put the same back down.

In addition, according to the present disclosure, by performing the ground contact detection control using the TOF sensor provided as the contact detection sensor and the measured value of the load cell at the same time, the detection error of the TOF sensor can be corrected. Therefore, it is possible to increase the accuracy of the robot control.

The effects of the present disclosure are not limited to the above-described effects, and other effects that are not described will be able to be clearly understood by those skilled in the art from the above detailed description.

DESCRIPTION OF DRAWINGS

FIG. 1 is a perspective view for describing a robot according to an embodiment of the present disclosure.

FIG. 2 is an exploded perspective view of FIG. 1.

FIG. 3 is a front view of the robot according to the embodiment of the present disclosure.

FIG. 4 is a rear view of the robot according to the embodiment of the present disclosure.

FIG. 5 is a side view of the robot according to the embodiment of the present disclosure.

FIG. 6 is a bottom view of the robot according to the embodiment of the present disclosure.

FIG. 7 is a view for describing a state in which an upper functional module has been removed from the robot according to the embodiment of the present disclosure.

FIG. 8 is a view for describing a leg unit in the robot according to the embodiment of the present disclosure.

FIG. 9 is a view for describing a connection relationship of the leg unit in the robot according to the embodiment of the present disclosure.

FIG. 10 is a view for describing a second link in the robot according to the embodiment of the present disclosure.

FIG. 11 is a view for describing a structure for hiding an electric wire in the robot according to the embodiment of the present disclosure.

FIGS. 12 and 13 are views for describing a change in location of a wheel according to the movement of the leg unit in the robot according to the embodiment of the present disclosure.

FIG. 14 is a view for describing a relationship between the arrangement of the wheel and the arrangement for coupling with a lower functional module in the robot according to the embodiment of the present disclosure.

FIG. 15 is a block diagram of the robot according to the embodiment of the present disclosure.

FIG. 16 is a flowchart showing a method of controlling horizontal attitude maintenance of the robot according to the embodiment of the present disclosure.

FIG. 17 is a flowchart showing a detailed flow of operation S100 in FIG. 16.

FIG. 18 is a flowchart showing a detailed flow of a method of correcting the front and rear tilt of a robot body in FIG. 16.

FIG. 19 is a flowchart showing a detailed flow of a method of correcting the left and right tilt of the robot body in FIG. 16.

FIGS. 20A to 20G are schematic diagrams of an embodiment of the robot in which the control method of FIG. 16 is performed.

FIG. 21 is a flowchart showing a ground contact detection control method of the robot according to the embodiment of the present disclosure.

FIG. 22 is a view showing a state in which the robot body is coupled to a lower functional module in the robot according to the embodiment of the present disclosure.

MODE FOR INVENTION

Hereinafter, exemplary embodiments of the present disclosure will be described in detail with reference to the accompanying drawings.

Since the present disclosure may have various changes and various embodiments, specific embodiments are shown in the accompanying drawings and specifically described in the detail descriptions. This is not intended to limit the present disclosure to specific embodiments and should be construed to include all modifications, equivalents, and substitutes included in the spirit and technical scope of the present disclosure.

FIG. 1 is a perspective view for describing a robot according to one embodiment of the present disclosure, FIG. 2 is an exploded perspective view of FIG. 1, FIG. 3 is a front view of the robot according to one embodiment of the present disclosure, FIG. 4 is a rear view of the robot according to one embodiment of the present disclosure, FIG. 5 is a side view of the robot according to one embodiment of the present disclosure, FIG. 6 is a bottom view of the robot according to one embodiment of the present disclosure, and FIG. 7 is a view for describing a state in which an upper functional module has been removed from the robot according to one embodiment of the present disclosure.

Referring FIGS. 1 to 7, a robot 1 according to one embodiment of the present disclosure will be described as follows.

The robot 1 according to the embodiment of the present disclosure is placed on a floor to move along a floor surface B. Therefore, the following description will be made by setting a vertical direction based on a state in which the robot 1 is placed on the floor.

In addition, the following description will be made by setting a direction in which a mapping camera 531 to be described below is disposed with respect to a battery 600 as a front. In addition, the following description will be made by setting a direction opposite to the front as a rear with respect to the battery 600.

A "lowest portion" of each component described in the embodiment of the present disclosure may be a portion of each component that is located to be lowest when the robot 1 according to the embodiment of the present disclosure is used by being placed on the floor, or may be a portion closet to the floor.

The robot 1 according to the embodiment of the present disclosure includes a robot body 100, a leg unit 200, and a wheel unit 300. In this case, the leg unit 200 is coupled to both side surfaces of the robot body 100, and the wheel unit 300 is coupled to the leg unit 200.

Robot Body

The robot body 100 may form an exterior of the robot 1. Components constituting the robot 1 may be coupled to the robot body 100.

For example, the leg unit 200 is coupled to each of frames 130 of both side surfaces of the robot body 100. In addition, a bumper 112 may be coupled to a front cover 110 provided on a front surface of the robot body 100.

In particular, functional modules 700 and 800 may be detachably coupled to the robot body 100 according to one embodiment of the present disclosure. Here, the functional modules 700 and 800 may include the upper functional module 700 coupled to an upper portion of the robot body 100 and the lower functional module 800 coupled to a space between a pair of wheels 310 (see FIGS. 1 and 22).

Therefore, the upper functional module 700 may be detachably coupled to an upper cover 140 disposed at an upper side of the robot body 100. The lower functional module 800 may be detachably coupled to a lower cover 150 disposed at a lower side of the robot body 100.

With this configuration, it is possible to perform various functions by coupling the functional modules 700 and 800 to the robot body 100. In addition, a new function may be added to the function in use by replacing the functional modules 700 and 800, or a new function may be added to the function in use by additionally mounting the functional modules 700 and 800.

In the embodiment of the present disclosure, the robot body 100 may be formed in a shape that has a horizontal width (or a diameter) larger than a vertical height. The robot body 100 may assist the robot 1 to have a stable structure and provide a structure that is advantageous in maintaining balance when the robot 1 moves (travels).

Some components constituting the robot 1 may be accommodated inside the robot body 100. For example, an internal space of the robot body 100 may accommodate one or more motors including a suspension motor MS, one or more sensors, and the battery 600.

The robot body 100 includes a front cover 110. The front cover 110 constitutes a front exterior of the robot 1. That is, the front cover 110 may be disposed at the foremost portion of the robot 1 when the robot 1 travels forward.

For example, the front cover 110 of the robot body 100 may be formed in a flat shape. As another example, the front cover 110 may have a plate shape with a curved surface. As still another example, the front cover 110 may have a plate shape bent at a predetermined angle.

The front cover 110 may be provided with a window 111. The window 111 may be made of a material through which light may transmit. For example, the window 111 may be made of a material through which infrared (IR), visible rays, or ultraviolet (UV) rays may transmit.

The front cover 110 includes an outer surface exposed to the outside of the robot 1 and an inner surface disposed on a back surface of the outer surface.

The bumper 112 may be coupled to the outer surface of the front cover 110. That is, the bumper 112 may be disposed in front of the robot body 100. For example, the bumper 112 may be provided at both end portions of the outer surface of the front cover 110, and a pair of bumpers 112 may be disposed in parallel in a vertical direction.

The bumper 112 may be provided to move relatively with respect to the robot body 100. For example, the bumper 112 may be coupled to the robot body 100 to reciprocate in a front-rear direction of the robot body 100.

The bumper 112 may be coupled along a portion of a front edge of the front cover 110. Alternatively, the bumper 112 may be coupled along the entire edge of the front cover 110. With this configuration, when the robot 1 collides with another object or person, the bumper 112 can protect the robot body 100 and components accommodated inside the robot body 100 by absorbing an impact applied to the robot body 100.

The mapping camera 531 may be disposed behind an inner surface of the front cover 110. Specifically, the mapping camera 531 may be disposed immediately behind the window 111. With this configuration, the mapping camera 531 may detect objects or people disposed in front of the robot 1.

Meanwhile, although not shown, the front cover 110 may include an input unit through which a control command is input from a user, a display unit for visually conveying information about an operating state of the robot 1 to the user, etc. For example, the front cover 110 may include a touch screen for visually displaying the operating state of the robot 1 and allowing the control command to be input from the user.

The robot body 100 includes a rear cover 120.

The rear cover 120 constitutes a rear exterior of the robot 1. For example, the rear cover 120 may be formed in a flat plate shape. As another example, the rear cover 120 may have a plate shape with a curved surface.

A manipulation unit 553 for adjusting power of the robot 1 may be disposed on the rear cover 120.

The manipulation unit 553 may be manipulated by the user, and the robot 1 may be turned on or off by manipulating the manipulation unit 553.

The manipulation unit 553 may be provided on the rear cover 120 to pivot in a left-right direction or provided to pivot in the vertical direction according to an embodiment.

For example, when the user pushes one side of the manipulation unit 553 and the manipulation unit 553 pivots to one side, the robot 1 may be turned on. In addition, when the user pushes the other side of the manipulation unit 553 and the manipulation unit 553 pivots to the other side, the robot 1 may be turned off.

A rear bumper 122 may be coupled to an outer surface of the rear cover 120. That is, the rear bumper 122 may be disposed behind the robot body 100. For example, the rear bumper 122 may be provided on the outer surface of the rear cover 120 and may be disposed in the horizontal direction. With this configuration, when the robot 1 collides with another object or person, the bumper 122 can protect the robot body 100 and the components accommodated inside the robot body 100 by absorbing an impact applied to the robot body 100.

The robot body 100 includes a side frame 130.

The side frame 130 constitutes the exterior of both side surfaces of the robot 1. For example, the side frame 130 may be disposed on each of both side surfaces of the robot 1 and configured to face each other. For example, the side frame 130 may be formed in a flat plate shape. That is, both side surfaces of the robot body 100 may be formed in a flat plate shape and disposed in parallel. As another example, at least a portion of the side frame 130 may be formed in a curved shape.

The side frame 130 is coupled to the front cover 110 and the rear cover 120. The side frame 130 may connect the front cover 110 to the rear cover 120. With this configuration, the robot body 100 may have an internal space surrounded by the front cover 110, the rear cover 120, and the two side frames 130.

The leg unit 200 may be disposed outside the side frame 130. Specifically, a first link 210 and a second link 220 may be rotatably coupled to the outside of the side frame 130.

Generally, in a two-wheeled robot, a support structure is disposed vertically under the robot body to support a load of the robot. However, when the support structure is present vertically under the robot body, there is a limitation in that a space under the robot cannot be used.

To solve this, the robot 1 according to the embodiment of the present disclosure has the leg unit 200 coupled to the side frame 130.

The suspension motor MS may be disposed inside the side frame 130.

Link coupling holes 131 and 132 are formed in the side frame 130. The link coupling holes include the first link coupling hole 131 and the second link coupling hole 132.

The first link coupling hole 131 is formed in a circular hole shape in the side frame 130. At least a portion of the first link 210 may be rotatably accommodated in the first link coupling hole 131. For example, one end portion of the first link 210 may be coupled to a shaft of the suspension motor MS through the first link coupling hole 131.

The second link coupling hole 132 is formed in a circular hole shape in the side frame 130. At least a portion of the second link 220 may be rotatably accommodated in the second link coupling hole 132. For example, the shaft formed at one side of the second link 220 may be rotatably coupled by passing through the second link coupling hole 132.

Meanwhile, the first link coupling hole 131 may be formed to have a larger diameter than the second link coupling hole 132.

The first link coupling hole 131 and the second link coupling hole 132 may be formed at a predetermined interval. For example, the center of the first link coupling hole 131 in a circular hole shape and the center of the second link coupling hole 132 in a circular hole shape may be disposed at the predetermined interval.

The first link coupling hole 131 and the second link coupling hole 132 may be disposed at a predetermined inclination with respect to the ground. For example, in a state in which the robot 1 is placed on the ground, the first link coupling hole 131 may be disposed at a lower side of the side frame 130, and the second link coupling hole 132 may be disposed at an upper rear side of the side frame 130.

With this configuration, the side frame 130 in which the link coupling holes 131 and 132 are formed may function as a kind of link.

Meanwhile, according to an embodiment, a handle hole 133 may be formed in the side frame 130. For example, the handle hole 133 may be formed at an upper front side of the side frame 130. With this configuration, the user may lift the robot body 100 upward by inserting his/her hand into the handle hole 133 and gripping the side frame 130.

The upper cover 140 constitutes the upper exterior of the robot 1. The upper cover 140 is coupled to the front cover 110, the rear cover 120 and the two side frames 130. Therefore, the upper cover 140 may cover an upper side of the internal space surrounded by the front cover 110, the rear cover 120, and the two side frames 130.

In a state in which the robot 1 is placed on the ground, the upper cover 140 may be disposed to be inclined at a predetermined angle with respect to the ground. For example, a front end portion of the upper cover 140 may be disposed closer to the ground than a rear end portion thereof is.

The upper functional module 700 may be coupled to the upper cover 140. The upper functional module 700 may be detachably coupled to an upper side of the upper cover 140. For example, a hook accommodation groove 141 may be formed to be hook-coupled to the upper functional module 700 in the upper cover 140. With this configuration, the upper functional module 700 may be coupled to the robot body 100 by only a user's simply operation of pushing the hook of the upper functional module 700 into the hook accommodation groove 141.

The robot body 100 may supply power to the upper functional module 700. Specifically, the upper cover 140 may include a terminal through which power may be supplied to the upper functional module 700.

In addition, the robot body 100 may transmit and receive signals to the upper functional module 700. Specifically, the upper cover 140 may include the terminal through which the signals may be transmitted and received to and from the upper functional module 700.

Meanwhile, in the embodiment of the present disclosure, the terminal through which power may be supplied to the upper functional module 700 and the terminal through which the signals may be transmitted and received to and from the upper functional module 700 may be disposed together on the upper cover 140. For example, the upper cover 140 may include a pogo pin 142 including two power pins and four signal pins.

At least one guide groove 143 may be formed in the upper cover 140. A lower surface of the upper functional module 700 may be coupled to the guide groove 143. With this configuration, the guide groove 143 may guide a coupling location of the upper functional module 700.

The lower cover 150 forms a lower exterior of the robot 1. The lower cover 150 is coupled to the front cover 110, the rear cover 120, and the two side frames 130. Therefore, the lower cover 150 may cover a lower side of the internal space surrounded by the front cover 110, the rear cover 120, and the two side frames 130.

The lower functional module 800 may be coupled to the lower cover 150. The lower functional module 800 may be detachably coupled to a lower side of the lower cover 150.

Specifically, the lower cover 150 may include a coupling bar 151 to be latch-coupled to the lower functional module 800.

The coupling bar 151 may be formed in a cylindrical shape and disposed in the left-right direction of the robot 1. In addition, a pair of protrusions connected to the coupling bar 151 may be formed to protrude from the lower cover 150.

The lower cover 150 may include a charging terminal 152. The charging terminal 152 may be disposed on a lower surface of the lower cover 150.

In this case, the charging terminal 152 may be disposed at a location facing the charging terminal provided on a robot charging station. The charging terminal 152 may be electrically connected to a charging terminal provided on the robot charging station. The robot 1 may receive power from the robot charging station through the charging terminal 152. In addition, the power supplied to the charging terminal 152 may be supplied to the battery 600.

Meanwhile, in general, in the two-wheeled robot, the support structure is disposed vertically under the robot body to support the load of the robot. However, when the support structure is present vertically under the robot body, there is a limitation in that a space under the robot cannot be used.

To solve this, the robot 1 according to one embodiment of the present disclosure has the leg unit 200 disposed on both side surfaces of the robot body 100. Therefore, a module coupling space 153 to which the lower functional module 800 is coupled is formed at the lower side of the lower cover 150.

The module coupling space 153 may be formed between the pair of leg units 200. For example, the module coupling space 153 may be a space vertically under the coupling bar 151. That is, the module coupling space 153 may be a space having a predetermined width ΔS in the left-right direction.

Therefore, since the lower functional module 800 is coupled to a space between a lower portion of the robot body 100 and the pair of leg units 200, thereby minimizing the volume of the robot 1 in the state in which the lower functional module 800 is mounted.

Meanwhile, although not shown, according to an embodiment, the robot body 100 may further include an external case. The external case may constitute the overall exterior of the robot body 100. The external case may cover the exteriors of the front cover 110, the rear cover 120, the side frame 130, the upper cover 140, and the lower cover 150. For example, the external case may be formed in an elliptical shape formed to extend in the left-right direction.

Leg Unit

FIG. 8 is a view for describing a leg unit in the robot according to one embodiment of the present disclosure, FIG. 9 is a view for describing a connection relationship of the leg unit in the robot according to one embodiment of the present disclosure, FIG. 10 is a view for describing a second link in the robot according to one embodiment of the present disclosure, and FIG. 11 is a view for describing a structure for hiding an electric wire in the robot according to one embodiment of the present disclosure.

The leg unit 200 of the robot 1 according to one embodiment of the present disclosure will be described with reference to FIGS. 8 to 11 as follows.

The leg unit 200 may be coupled to the robot body 100 to support the robot body 100. For example, a pair of leg units 200 are provided and are each coupled to the side frame 130 of the robot body 100. In this case, at least a portion of the leg unit 200 is disposed closer to the ground than the robot body 100. Therefore, the robot body 100 may travel in the form of standing on the ground by the pair of leg units 200. That is, gravity applied to the robot body 100 may be supported by the leg unit 200, and a height of the robot body 100 can be maintained.

In the robot 1 according to one embodiment of the present disclosure, the leg unit 200 is coupled to only both side surfaces of the robot body 100. That is, the leg unit 200 is not coupled to the lower and rear surfaces of the robot body 100.

Therefore, as shown in FIGS. 3 to 14, a space is formed between the lower side of the lower cover 150 and the pair of leg units 200. For example, a space in which a rectangular parallelepiped-shaped lower functional module 800 may be accommodated may be formed between the lower side of the lower cover 150 and the pair of leg units 200.

The leg unit 200 includes the first link 210, the second link 220, and the third link 230. In this case, the first link 210 and the second link 220 are rotatably coupled to the side frame 130 and the third link 230, respectively. That is, the first link 210 and the second link 220 are link-coupled to the side frame 130 and the third link 230, respectively.

The first link 210 is link-coupled to the side surface of the robot body 100. For example, the first link 210 may be link-coupled to the side frame 130.

The first link 210 is connected to the suspension motor MS. For example, the first link 210 may be connected to the shaft of the suspension motor MS directly or through a gear. With this configuration, the first link 210 receives a driving force from the suspension motor MS.

The first link 210 includes a first link body 211, a motor coupling portion 212, and a link coupling portion 213.

The first link body 211 is formed in a frame shape that extends to connect the motor coupling portion 212 to the link coupling portion 213. The first link body 211 has the motor coupling portion 212 provided at one side in a longitudinal direction and the link coupling portion 213 provided at the other side in the longitudinal direction. In this case, the motor coupling portion 212 may be disposed farther from the ground than the link coupling portion 213.

The first link body 211 may be formed in a shape that is bent at least once. For example, the other side of the first link body 211 provided with the link coupling portion 213 may be disposed farther from the robot body 100 than the one side provided with the motor coupling portion 212. Therefore, a distance between the pair of first link bodies 211 increases from the top to the bottom in the vertical direction. With this configuration, the first link 210 can stably support the robot body 100.

A rib 211*a* may be formed on the first link body 211. For example, the rib may be formed to protrude from the first link body 211 in the longitudinal direction. In this case, the rib 211*a* may be formed in an area in which the first link body 211 is bent. With this configuration, the rib 211*a* can increase durability by reinforcing the first link 210.

The motor coupling portion 212 is formed to be connected to one end portion of the first link body 211.

The motor coupling portion 212 is rotatably accommodated in the first link coupling hole 131 of the side frame 130. For example, the motor coupling portion 212 may be formed in a disk shape or a circular plate shape. In this case, a maximum diameter of the motor coupling portion 212 may be equal to or smaller than a maximum diameter of the first link coupling hole 131. Therefore, the motor coupling portion 212 may be connected to the suspension motor MS through the first link coupling hole 131.

The motor coupling portion 212 is connected to the suspension motor MS. For example, the motor coupling portion 212 is fixedly coupled to the shaft of the suspension motor MS. With this configuration, when the suspension motor MS is driven, the motor coupling portion 212 may be rotated in conjunction with the rotation of the shaft of the suspension motor MS.

The link coupling portion 213 is formed on the other end portion of the first link body 211.

The link coupling portion 213 is rotatably coupled to the third link 230. Specifically, the link coupling portion 213 is rotatably coupled to the third link 230 through a first link shaft 214. For example, the link coupling portion 213 may be formed in a disk shape, and the first link shaft 214 may be coupled by passing through the center of the link coupling portion 213. In addition, the first link shaft 214 may be rotatably coupled by passing through the third link 230. With this configuration, the first link 210 and the third link 230 may be connected to rotate relatively.

The first link shaft 214 is provided to connect the first link 210 to the third link 230. For example, the first link shaft 214 may be coupled by passing through the link coupling portion 213 of the first link 210 and/or the third link 230. In this case, the first link shaft 214 may be rotatably coupled to the link coupling portion 213 and/or the third link 230. With this configuration, the first link shaft 214 may be an axis about which the third link 230 rotates.

A gravity compensator 215 compensates for the robot body 100 that moves down vertically due to gravity. That is, the gravity compensator 215 provides a force for supporting the robot body 100.

For example, the gravity compensator 215 may be a torsion spring. The gravity compensator 215 may be wound to surround an outer circumferential surface of the first link shaft 214. In addition, one end portion of the gravity compensator 215 is fixedly coupled by being inserted into the first link 210, and the other end portion of the gravity compensator 215 is fixedly coupled by being inserted into the third link 230.

The gravity compensator 215 applies a force in a direction in which an angle between the first link 210 and the third link 230 increases. For example, both end portions of the gravity compensator 215 contract in advance to apply a restoring force in a direction in which the angle between the first link 210 and the third link 230 increases. Therefore, even when the robot 1 is placed on the ground and gravity is applied to the robot body 100, the angle between the first link 210 and the third link 230 can be maintained within a predetermined angle range.

With this configuration, it is possible to prevent the robot body 100 from moving down toward the ground even when the suspension motor MS is not driven. Therefore, the gravity compensator 215 prevents energy loss due to driving the suspension motor MS and maintains the height of the robot body 100 to a predetermined distance or more from the ground.

The second link 220 is link-coupled to the side surface of the robot body 100. For example, the second link 220 may be link-coupled to the side frame 130. That is, the second link 220 may be coupled to the side frame 130 to which the first link 210 is coupled together.

The second link 220 includes a second link body 221, a frame coupling portion 222, and a link coupling portion 223. In this case, the frame coupling portion 222 may be disposed farther from the ground than the link coupling portion 223.

The second link body 221 is formed in a frame shape that extends to connect the frame coupling portion 222 to the link coupling portion 223. The second link body 221 has the frame coupling portion 222 provided at one side in a longitudinal direction and the link coupling portion 223 provided at the other side in the longitudinal direction.

The second link body 221 may be formed in a shape that is bent at least once. For example, the other side of the second link body 221 provided with the link coupling portion 223 may be disposed farther from the robot body 100 than the one side provided with the frame coupling portion 222. Therefore, a distance between the pair of second link bodies 221 increases from the top to the bottom in the vertical direction. With this configuration, the second link 220 can stably support the robot body 100.

The second link body 221 includes an inner surface facing the robot body 100 and an outer surface facing a direction away from the robot body 100.

A rib 221*a* may be formed on the second link body 221. For example, the rib 221*a* may be formed to protrude from the outer surface of the second link body 221 in the longitudinal direction. In this case, the rib 221*a* may be formed in an area in which the second link body 221 is bent. With this configuration, the rib 221*a* can increase durability by reinforcing the second link 220.

An electric wire accommodation wall 221*b* may be formed on the second link body 221. For example, a pair of electric wire accommodation walls 221*b* may be formed to protrude from the inner surface of the second link body 221 in the longitudinal direction. In this case, the pair of electric wire accommodation walls 221*b* may be formed in parallel at a predetermined interval. With this configuration, the electric wire may be accommodated in the space surrounded by the second link body 221 and the electric wire accommodation walls 221*b*. Therefore, it is possible to prevent the electric wire from being exposed to the outside.

In addition, the second link 220 may be provided with an electric wire support pin 221*c*. The electric wire support pin 221*c* may pass through the pair of electric wire accommodation walls 221*b*. The electric wire support pin 221*c* may be disposed in a direction crossing the pair of electric wire accommodation walls 221*b*. With this configuration, the electric wire accommodation wall 221*b* may close a portion of an open area in the space surrounded by the second link body 221 and the electric wire accommodation walls 221*b*. Therefore, it is possible to prevent the electric wire from coming out of the space surrounded by the second link body 221 and the electric wire accommodation walls 221*b*.

The frame coupling portion 222 is formed to be connected to one end portion of the second link body 221.

The frame coupling portion 222 is rotatably coupled to the second link coupling hole 132 of the side frame 130. For example, the frame coupling portion 222 may be provided with a coupling shaft 222*a* coupled by passing through the side frame 130.

The coupling shaft 222*a* may be formed in a cylindrical shape. For example, an outer diameter of the other end portion of the coupling shaft 222*a* may be larger than an outer diameter of one end portion of the coupling shaft 222*a* coupled to the side frame 130 in an axial direction (longitudinal direction).

A hollow 222*b* may be formed in the coupling shaft 222*a*. The electric wire may pass through the hollow 222*b*. With this configuration, it is possible to prevent the electric wire through which power is supplied from the battery 600 to a wheel motor MW from being exposed to the outside.

In addition, the electric wire through hole 222*c* may be formed in the coupling shaft 222*a*. The electric wire through hole 222*c* may be formed on an outer circumferential surface of the other end portion of the coupling shaft 222*a* in the axial direction. With this configuration, in the robot body 100, the electric wire passing through the hollow 222*b* may pass through the electric wire through hole 222*c* and may be accommodated in the second link body 221.

The coupling shaft 222*a* may be coupled to a rotational connection plate 222*d*. For example, the rotational connection plate 222*d* may be formed in a disk shape, and a diameter of the rotational connection plate 222*d* may be formed to be smaller than a diameter of the other end portion of the coupling shaft 222*a* in the axial direction. Therefore, the rotational connection plate 222*d* may be coupled by being accommodated in the other end portion of the coupling shaft 222*a* in the axial direction.

The rotational connection plate 222*d* may be formed integrally with the second link body 221. An outer end portion of the rotational connection plate 222*d* in a radial direction may be formed to be connected to the second link body 221. With this configuration, the rotational connection plate 222*d* may couple the second link body 221 to the coupling shaft 222*a*.

The link coupling portion 223 is formed on the other end portion of the second link body 221.

The link coupling portion 223 is rotatably coupled to the third link 230. Specifically, the link coupling portion 223 is rotatably coupled to the third link 230 through a second link shaft 224. For example, the link coupling portion 223 may be formed in a disk shape, and the second link shaft 224 may be coupled by passing through the center of the link coupling portion 223. In addition, the second link shaft 224 may be rotatably coupled by passing through the third link 230. With this configuration, the second link 220 and the third link 230 may be connected to rotate relatively.

The second link shaft 224 is provided to connect the second link 220 to the third link 230. For example, the second link shaft 224 may be coupled by passing through the link coupling portion 223 of the second link 220 and/or the third link 230. In this case, the second link shaft 224 may be rotatably coupled to the link coupling portion 223 and/or the third link 230. With this configuration, the second link shaft 224 may be an axis about which the third link 230 rotates.

The third link 230 is link-coupled to the first link 210 and the second link 220 and coupled to the wheel unit 300.

The third link 230 includes a third link body 231. The third link body 231 is formed in a frame shape that extends to connect a fourth link coupling hole 233 to a wheel coupling portion 234. The third link body 230 has a third link coupling hole 232 and the fourth link coupling hole 233 formed at one side thereof in the longitudinal direction and the wheel coupling portion 234 formed at the other side in the longitudinal direction.

The third link body 231 may be formed in a shape that is bent at least once. For example, a pair of third link bodies 231 have a distance between the other sides at which the wheel coupling portion 234 is formed, which is shorter than a distance between one sides at which the third link coupling hole 232 and the fourth link coupling hole 233 are formed.

At least one rib 231*a* may be formed to protrude from the third link body 231 in the longitudinal direction. The rib 231*a* may be formed in a bent area of the third link body 231. With this configuration, the rib may reinforce the third link body 231.

The third link coupling hole 232 is formed in the third link body 231. Specifically, the third link coupling hole 232 is formed at one side of the third link body 231 in the longitudinal direction. The first link shaft 214 may be rotatably coupled by passing through the third link coupling hole 232. For example, the third link coupling hole 232 may be formed in a circular hole shape. With this configuration, the third link 230 may be rotatably connected to the first link 210 through the first link shaft 214.

A hole into which the gravity compensator 215 is coupled may be formed in the third link body 231. For example, the other end portion of the torsion spring may be coupled by being inserted into the hole.

The fourth link coupling hole 233 is formed in the third link body 231. Specifically, the fourth link coupling hole 233 is formed at one side of the third link body 231 in the longitudinal direction. The second link shaft 224 may be rotatably coupled by passing through the fourth link coupling hole 233. For example, the fourth link coupling hole 233 may be formed in a circular hole shape. With this configuration, the third link 230 may be rotatably connected to the second link 220 through the second link shaft 224.

The fourth link coupling hole 233 may be disposed farther from the wheel coupling portion 234 than the third link coupling hole 232.

The third link 230 is coupled to the wheel unit 300. In this case, a wheel housing 320 is coupled to an inner surface (surface facing the robot body 100) of the third link body 231, and the wheel 310 is rotatably coupled to an outer surface (back surface of the inner surface) of the third link body 231.

Meanwhile, the wheel coupling portion 234 is formed on the third link body 231. Specifically, the wheel coupling portion 234 is formed at the other side of the third link body 231 in the longitudinal direction.

For example, the wheel coupling portion 234 may be formed in a circular hole shape. The wheel motor MW may be accommodated in the wheel coupling portion 234.

Meanwhile, in a state in which the robot 1 stands on the ground, the wheel coupling portion 234 may be disposed vertically under the robot body 100. For example, in the state in which the robot 1 stands on the ground, the wheel coupling portion 234 may be disposed vertically under the suspension motor MS.

The suspension motor MS is relatively heavy among the components accommodated in the robot body 1. Therefore, the entire weight of the robot body 1 may be concentrated vertically under the suspension motor MS.

With this configuration, the wheel 310 coupled to the wheel coupling portion 234 can maintain the balance of the robot body 1 by supporting a lower side of the center of gravity of the robot body 1.

Wheel Unit

Referring to FIGS. 1 to 7, the wheel unit 300 may be rotatably coupled to the leg unit 200 and may roll along the ground to move the robot body 100 and the leg unit 200.

The wheel unit 300 includes the wheel 310 that is in contact with the ground and rolls along the ground, and the wheel housing 320 in which the wheel motor MW is accommodated.

The wheel 310 is provided to have a predetermined radius and a predetermined width in the axial direction. As shown in FIG. 3, when viewing the robot 1 from the front, the side frame 130 and the leg unit 200 may be disposed vertically above the wheel 310. In addition, referring to FIG. 2, the suspension motor MS, the first link coupling hole 131, and the second link coupling hole 132 may be disposed vertically above the wheel 310.

The wheel 310 includes a wheel frame 311 formed in a circular shape. The wheel frame 311 may be formed in a cylindrical shape with an open one side facing the shaft of the wheel motor MW. Therefore, a weight of the wheel frame 311 can be reduced.

However, when the wheel frame 311 is formed in a cylindrical shape, the overall rigidity of the wheel frame 311 can be reduced. In consideration of such a point, the rib for reinforcing rigidity may be formed on each of the inner and outer surfaces of the wheel frame 311.

A wheel tire 312 is coupled to an outer circumferential surface of the wheel frame 311. The wheel tire 312 may be formed in an annular shape with a diameter of the wheel tire 312 fitted into the outer circumferential surface of the wheel frame 311.

Grooves of a predetermined pattern may be recessed in the outer circumferential surface of the wheel tire 312 to increase a grip force of the wheel tire 312.

In one embodiment, the wheel tire 312 may be made of an elastic rubber material.

The wheel housing 320 may have a cylindrical shape with an open one side in the axial direction so that the wheel motor MW is accommodated therein. In this case, a closed portion of the wheel housing 320 may be coupled to an inner surface of the third link 230. With this configuration, it is possible to prevent an external foreign substance from flowing into the wheel housing 320.

Meanwhile, the wheel housing 320 may be provided with a sensor for measuring a distance to the ground. For example, the sensor may be a time of flight sensor (ToF sensor). With this configuration, a controller 500 may determine whether the wheel 310 is in contact with the ground.

The wheel 310 is rotatably coupled to the leg unit 200. Specifically, the wheel 310 is rotatably coupled to an outer surface (surface facing the outside of the robot 1) of the third link 230.

The wheel motor MW may provide a driving force to the wheel 310. The wheel motor MW may generate a rotational force by receiving power from the battery 600.

The wheel motor MW may be accommodated in the wheel housing 320. In addition, the wheel motor MW may pass through the wheel coupling portion 234 of the third link 230, and the shaft of the wheel motor MW may be coupled to the wheel frame 311 of the wheel 310. That is, the wheel motor MW may be an in-wheel motor.

With this configuration, when the wheel motor MW is driven, the wheel 310 may roll along the ground while rotating, and the robot 1 may move along the ground.

Balance of Robot by Four-Bar Linkage

FIGS. 12 and 13 are views for describing a change in location of a wheel according to the movement of the leg unit in the robot according to one embodiment of the present disclosure, and FIG. 14 is a view for describing a relationship between the arrangement of the wheel and the arrangement for coupling with a lower functional module in the robot according to one embodiment of the present disclosure.

Referring FIGS. 12 to 14, the balance of the robot 1 according to one embodiment of the present disclosure will be described as follows.

The robot 1 according to the embodiment of the present disclosure may support the robot body 100 through the four-bar linkage structure and maintain the balance of the robot body 100.

The balance of the robot 1 in the front-rear direction according to one embodiment of the present disclosure will be described with reference to FIGS. 12 and 13 as follows.

The leg unit 200 is provided on each of both side surfaces of the robot body 100. Specifically, the first link 210 and the second link 220 are rotatably coupled to the side frames 130 provided at both sides of the robot body 100, and the first link 210 and the second link 220 is link-coupled to the third link 230. That is, the robot 1 supports the robot body 100 through the four-bar linkage composed of the side frame 130, the first link 210, the second link 220, and the third link 230.

Meanwhile, in the embodiment of the present disclosure, the gravity compensator 215 generates a restoring force in a direction of lifting the robot body 100. Therefore, even in a state in which the suspension motor MS is not driven, the pair of leg units 200 can maintain the state of lifting the robot body 100 to a predetermined height from the ground.

Meanwhile, the robot 1 according to the embodiment of the present disclosure can maintain the balance by lifting any one of the pair of wheels 310 to pass an obstacle or driving the suspension motor MS when the height of the robot body 100 is lowered for charging, etc.

When the suspension motor MS is driven, the link coupling portion 213 moves upward as the first link 210 rotates about the motor coupling portion 212. In addition, the third link 230 is moved by rotating the first link 210. In addition, the second link 220 is rotated by being pushed by the third link 230. As a result, one end portion of the third link 230 may be moved rearward, and the other end portion of the third link 230 may be moved upward.

With this configuration, even when the wheel 310 moves upward and downward, a movement range of the wheel 310 in the front-rear direction may be limited. Therefore, the robot 1 can stably maintain the balance.

Therefore, the robot 1 according to the present disclosure may pass obstacles of various heights using the four-joint link structure.

In the robot 1 according to the embodiment of the present disclosure, a center of the first link coupling hole 131 at C1 and a center of the second link coupling hole 132 at C2, may be disposed at a predetermined first distance d1. In addition, a center of the motor coupling portion 212 of the first link 210 at C1 and a center of the link coupling part 213 of the first link 210 at C3 may be disposed at a predetermined second distance d2. In addition, a center of the frame coupling portion 222 of the second link 220 at C2 and a center of the link coupling portion 223 of the second link 220 at C4, may be disposed at a predetermined third distance d3. In addition, a center of the third link coupling hole 232 of the third link 230 at C3 and a center of the fourth link coupling hole 233 of the third link 230 at C4, may be disposed at a predetermined fourth distance d4. In addition, the center of the third link coupling hole 232 of the third link 230 at C3 and a center of the wheel coupling portion 234 of the third link 230 at C5, may be disposed at a predetermined fifth distance d5.

In this case, the first distance d1, the second distance d2, the third distance d3, the fourth distance d4, and the fifth distance d5 may be disposed to have a predetermined length ratio. For example, the first distance d1 may be 0.5 times or more and 0.6 times or less the fifth distance d5. The second distance d2 may be 0.95 times or more and 1.05 times or less the fifth distance d5. The third distance d3 may be 1.1 times or more and 1.2 times or less the fifth distance d5. The fourth distance d4 may be 0.2 times or more and 0.3 times or less the fifth distance d5.

With this configuration, even when the third link 230 is moved by driving the motion motor MS, a movement distance of the wheel coupling portion 234 in the front-rear direction can be maintained within a predetermined deviation ΔD. For example, even when the third link 230 is moved, the movement distance of the center of the wheel coupling portion 234 at C5 in the front-rear direction can be maintained within 2% of the fifth distance d5.

Therefore, while the robot 1 is moving, the center of gravity of the robot body 100 may be disposed vertically above the wheel 310. Therefore, the robot 1 can be prevented from shaking in the front-rear direction while moving and can maintain the balance.

In addition, according to the robot 1 according to the present disclosure, even when the wheels 310 move upward while the robot 1 passes an obstacle, the balance can be maintained without changing locations of the wheels 310 in the front-rear direction.

The balance of the robot 1 in a left-right direction according to the embodiment of the present disclosure will be described with reference to FIG. 14 as follows.

As shown in FIG. 14, the robot body 100 is supported by the pair of leg units 200 and the wheel unit 300.

The load of the robot body 100 may be transmitted to the wheel 310 through the leg units 200, and the wheel 310 may support the leg units 200 and the robot body 100.

In this case, the pair of leg units 200 may be disposed symmetrically (line symmetrically). In particular, the link-coupled portions of the pair of leg units 200 may be disposed in parallel.

Specifically, the motor coupling portions 212 of the pair of first links 210 may be disposed in parallel. The link coupling portions 213 of the pair of first links 210 may be disposed in parallel. The frame coupling portions 222 of the pair of second links 220 may be disposed in parallel. The link coupling portions 223 of the pair of second links 220 may be disposed in parallel. The wheel coupling portions 234 of the pair of third links 230 may be disposed in parallel.

With this configuration, the module coupling space 153 having a predetermined width ΔS is formed at the lower side of the robot body 100. The module coupling space 153 may be formed in parallel to the pair of leg units 200. In addition, the module coupling space 153 may be formed in parallel to the pair of wheels 310.

At least one motor including the suspension motor MS and the battery 600 may be provided inside the robot body 100, and when the robot 1 is placed on the ground, the entire load of the robot body 100 in a state in which the motor and the battery 600 are accommodated may be applied to the leg units 200.

In particular, since the robot 1 according to one embodiment of the present disclosure is provided with the leg unit 200 at both side surfaces of the robot body 100, the load of the robot body 100 is concentrated on the pair of side frames 130 and the pair of leg units 200.

In this case, as shown in FIG. 14, based on when viewing the front surface of the robot 1 from the front of the robot 1, the side frame 130 and the leg units 200 may all be disposed vertically above the wheel 310.

That is, as shown in FIG. 14, both the side frames 130 and the leg units 200 may all be disposed between a virtual line a1 vertically extending the outer end portion of the wheel 310 in the axial direction and a virtual line a2 vertically extending the inner end portion of the wheel 310 in the axial direction.

In addition, thicknesses (length of the robot 1 in the left-right direction) of the leg unit 200 and the side frame 130 are smaller than a thickness (length of the robot 1 in the left-right direction, ΔW) of the wheel 310.

With this configuration, the entire load of the robot body 100 applied to the side frames 130 and the leg units 200 can be stably supported by the wheels 310 disposed thereunder in the direction of gravity.

Therefore, according to the robot 1 according to the embodiment of the present disclosure, the balance of the robot body 100 can be stably maintained by concentrating the load of the robot body 100 vertically above the pair of wheels 310.

In addition, the leg unit 200 may be pressed vertically downward by the load of the robot body 100, and the application of the load of the robot 1 in the left-right direction can be prevented, thereby preventing the robot 1 from shaking in the left-right direction.

FIG. 15 is a block diagram of the robot 1 according to the embodiment of the present disclosure.

Referring to FIG. 15, the robot 1 according to the embodiment of the present disclosure may include a controller 510, a motor unit 520, a sensor unit 530, an interface unit 550, the battery 560, a memory 570, and a communication unit 580.

Since components shown in the block diagram of FIG. 15 are not essential in implementing the robot 1, the robot 1 described herein may have a larger or fewer number of components than the components listed above.

First, the controller 510 may control the overall operation of the robot 1. The controller 510 may control the robot 1 to perform various functions according to setting information stored in the memory 570 to be described below.

The controller 510 may be disposed on the robot body 100. More specifically, the controller 510 may be provided by being mounted on a printed circuit board (PCB) disposed between the left wheel 310 and the right wheel 310.

The controller 510 may include all types of devices capable of processing data, such as a processor. Here, "processor" may be, for example, a data processing device built into hardware, which has a physically structured circuit to perform a function expressed by code or commands included in a program. As an example of the data processing device built into hardware, processing devices such as a microprocessor, a central processing unit (CPU), a processor core, a multiprocessor, an application-specific integrated circuit (ASIC), and a field programmable gate array (FPGA) may be included, but the scope of the present disclosure is limited thereto.

The controller 510 may receive information about an external environment of the robot 1 from at least one component of the sensor unit 530 to be described below. In this case, the information about the external environment may be, for example, information such as a temperature, humidity, and amount of dust in an interior where the robot 1 travels. Alternatively, the information may be, for example, cliff information. Alternatively, the information may be, for example, interior map information. Of course, the information about the external environment is not limited to the above examples.

The controller 510 may receive information about a current state of the robot 1 from at least one component of the sensor unit 530 to be described below. In this case, the current state may be, for example, tilt information of the robot body 100. Alternatively, the information may be, for example, information about a separation state between the wheel 310 and the ground. Alternatively, the information may be, for example, location information of the wheel motor MW. Alternatively, the information may be, for example, location information of the suspension motor MS. Of course, information about the current state of the robot 1 is not limited to the above examples.

The controller 510 may transmit a driving control command to at least one of components of the motor unit 520 to be described below. For example, the rotation of the wheel motor MW may be controlled for the traveling of the robot 1. Alternatively, for example, the rotation of the wheel motor MW may be controlled to maintain the horizontal attitude of the robot 1. Alternatively, for example, the rotation of the suspension motor MS may be controlled to maintain the horizontal attitude of the robot 1. Alternatively, for example, the controller 510 may control the rotation of the upper plate motor 525 to adjust an angle of the upper functional module 700 of the robot 1.

The controller 510 may receive a user's command through at least one of components of the interface unit 550 to be described below. For example, the command may be a command for turning on/off the robot 1. Alternatively, for example, the command may be a command for manually controlling various functions of the robot 1.

The controller 510 may output information related to the robot 1 through at least one of the components of the interface unit 550 to be described below. For example, the output information may be visual information. Alternatively, for example, the output information may be auditory information.

The motor unit 520 may include at least one motor and provide a driving force to a component connected to each motor.

The motor unit 520 may include the wheel motor MW for providing a driving force to the left and right wheels 310. More specifically, the motor unit 520 may include a left wheel motor MW_L for transmitting a driving force to the left wheel 310 and a right wheel motor MW_R for transmitting a driving force to the right wheel 310.

The wheel motors MW may be disposed in the wheel units 300, respectively. More specifically, the wheel motor MW may be accommodated in the wheel housing 320. The wheel motor MW may be accommodated in the wheel coupling portion 234.

The wheel motor MW is connected to the wheel 310. More specifically, a final output stage of a shaft or gear of the left wheel motor MW_L is connected to the left wheel 310. A final output stage of a shaft or gear of the right wheel motor MW_R is connected to the right wheel 310. Each of the left and right wheel motors MW rotates by being driven according to the control command of the controller 510, and the robot 1 travels along the ground due to the rotation of the wheel 310 according to the rotation of the wheel motor MW.

The motor unit 520 may include the suspension motor MS for providing a driving force to the left and right leg units 200. More specifically, the motor unit 520 may include a left suspension motor MS_L for transmitting a driving force to the left leg unit 200 and a right suspension motor MS_R for transmitting a driving force to the right leg unit 200.

The suspension motor MS may be disposed on the robot body 100. More specifically, the suspension motor MS may be disposed inside each of the side frames 130.

The suspension motor MS is connected to the first link 210. More specifically, a final output stage of a shaft or gear of the left suspension motor MS_L is connected to the left first link 210. A final output stage of a shaft or gear of the right suspension motor MS_R is connected to the right first link 210. Each of the left and right suspension motors MS rotates by being driven according to the control command of the controller 510, and as the first link 210 rotates according to the rotation of the suspension motor MS and the third link 230 connected to the first link 210 rotates, as a result, the wheel 310 connected to the third link 230 moves upward or downward.

Therefore, the robot 1 may lift or lower the wheel 310 and maintain a horizontal attitude when climbing an obstacle or traveling along a curved ground. Detailed description thereof will be made in detail below.

The motor unit 520 may include an upper plate motor 525 for providing a driving force to the upper functional module 700. The upper plate motor 525 may be a servo motor. The servo motor is a well-known motor used where rotation angle control is required and has a limited operating range but has an advantage in that accurate position control is possible.

As described above, the upper functional module 700 may be detachably coupled to the upper cover 140 of the robot body 100. The upper functional module 700 may be provided in various forms according to functions. For example, the upper functional module 700 may be a flat plate shape so that an object such as a mobile phone may be placed thereon. For example, the upper functional module 700 may have a shape provided with an accommodation groove so that cans, bottles, cups, etc. in which a fluid is accommodated may be placed thereon and transported. For example, the upper functional module 700 may be an interaction upper functional module 700 provided to visually and audibly display a response of the robot 1 for emotional interaction with a user.

In this case, the interaction upper functional module 700 may include a display. The display may display facial expressions or eye shapes so that the user may feel that he/she is interacting with the robot 1. In this case, the display of the interaction upper functional module 700 may rotate at a preset angle.

The upper plate motor 525 may provide a driving force to the display of the interaction upper functional module 700. The upper plate motor 525 may be disposed in the upper functional module 700. More specifically, a final output stage of a shaft or gear of the upper plate motor 525 is connected to the display. The upper plate motor 525 may be rotated by being driven according to a control command of the controller 510, and the display may rotate according to the rotation of the upper plate motor 525.

The sensor unit 530 may include at least one sensor, and each sensor may measure or detect information about an external environment of the robot 1 and/or information about a current state of the robot 1.

The sensor unit 530 may include the first camera 531.

The first camera 531 may be the above-described mapping camera. The first camera 531 is provided to map an interior in which the robot 1 travels.

To this end, the first camera 531 may be disposed in front of the robot body 100. More specifically, the first camera 531 may be disposed behind the inner surface of the front cover 110. The first camera 531 may be disposed behind the window 111.

The first camera 531 may photograph the interior while traveling to perform simultaneous localization and mapping (SLAM). The controller 510 may implement the SLAM based on information about the surrounding environment photographed by the first camera 531 and information about the current location of the robot 1.

Meanwhile, a method in which the robot 1 according to the embodiment of the present disclosure implements the SLAM may be a method implemented using only the first camera 531, but is not limited thereto. For example, the robot 1 may implement the SLAM further using an additional sensor. The additional sensor may be, for example, a laser distance sensor (LDS).

The sensor unit 530 may include a second camera 532.

The second camera 532 is a component provided to recognize a user's location and/or face.

To this end, the second camera 532 may be disposed in the upper functional module 700. More specifically, the second camera 532 may be disposed adjacent to the display of the upper functional module 700. The second camera 532 may be disposed on an upper portion of the display. The second camera 532 may be disposed between left and right speakers 552.

The second camera 532 may recognize the user's location by capturing a forward image of the display. To this end, the second camera 532 may include a depth module and an RGB module.

The depth module may acquire depth information of the image. For example, the depth information may be obtained in a manner of acquiring moving time information by measuring a retardation or phase shift of a modulated optical signal for all pixels of the captured image.

The RGB module may acquire color images (images). Edge characteristics, color distribution, frequency characteristics or wavelet transform, etc. may be extracted from the color images.

As described above, whether a user is present in front or the user's location may be recognized by acquiring distance information about an object to be recognized through the depth information from the forward image captured by the second camera 532 and calculating the edge characteristics, etc. extracted from the color images together.

The sensor unit 530 may include an IR sensor 533 for detecting infrared rays.

The IR sensor 533 may be an IR camera for detecting infrared rays.

The IR sensor 533 may be disposed on the robot body 100. More specifically, the IR sensor 533 may be disposed behind the inner surface of the front cover 110. The IR sensor 533 may be disposed behind the window 111. The IR sensor 533 may be disposed in a left-right direction or vertical direction from the first camera 532.

The robot may approach the module by allowing the IR sensor 533 to detect infrared rays emitted by an IR LED provided in a specific module. For example, the module may be a charging station for charging the robot 1. For example, the module may be the lower functional module 800 detachably provided on the lower cover 150 of the robot 1.

The controller 510 may control the IR sensor 533 to start detecting the IR LED when a charging state of the robot 1 is a preset level or less. The controller 510 may control the IR sensor 533 to start detecting the IR LED when a command to find a specific module is received from a user.

The sensor unit 530 may include a wheel motor sensor 534.

The wheel motor sensor 534 may measure the location of the wheel motor MW. For example, the wheel motor sensor 534 may be an encoder. As is well known, the encoder may detect the location of the motor and also detect a rotational speed of the motor.

The wheel motor sensor 534 may be disposed on each of the left and right wheel motors MW. More specifically, the wheel motor sensor 534 may be connected to the final output end of the shaft or gear of the wheel motor MW and accommodated inside the wheel housing 320 together with the wheel motor MW.

The sensor unit 530 may include an upper plate motor sensor 535.

The upper plate motor sensor 535 may measure a rotation angle of the display of the interaction upper functional module 700. For example, the upper plate motor sensor 535 may be a potentiometer for measuring a rotation angle.

The upper plate motor sensor 535 may be disposed in the interaction upper functional module 700. More specifically, the upper plate motor sensor 535 may be connected to the final output stage of the shaft or gear of the upper plate motor 525 and disposed behind the display together with the upper plate motor 525.

The sensor unit 530 may include a tilt detection sensor 536.

The tilt detection sensor 536 may measure a tilt angle of the robot body 100.

The tilt detection sensor 536 may be, for example, a three-axis acceleration sensor. The acceleration sensor is a sensor for detecting a gravitational acceleration of an object in a stationary state. Since the gravitational acceleration varies depending on a tilt angle of the object, the tilt angle is obtained by measuring the gravitational acceleration. However, there is a disadvantage in that a correct value cannot be obtained in a moving acceleration state rather than a stationary state.

The tilt detection sensor 536 may be, for example, a three-axis gyro sensor. The gyro sensor is a sensor for measuring an angular velocity. A tilt angle is obtained by integrating the angular velocity over the entire time. However, continuous errors occur in the angular velocity measured by the gyro sensor due to noise and other reasons, and due to these errors, an error in an integral value accumulatively occurs over time.

As a result, when a long time elapses in a stationary standby state, the tilt of the robot 1 may be accurately measured by the acceleration sensor, but an error is caused by the gyro sensor. While traveling, an accurate tilt value of the robot 1 may be measured using the gyro sensor, but a correct value cannot be obtained using the acceleration sensor.

Preferably, the tilt detection sensor 536 may be an inertial measurement unit (IMU) sensor. As is well known, the IMU sensor is a sensor in which a three-axis acceleration sensor, a three-axis gyro sensor, and a geomagnetic sensor are embedded together and is also referred to as an inertial measurement sensor. The disadvantages of the above-described acceleration sensor and gyro sensor may be compensated using the IMU sensor.

Hereinafter, in the present specification, an embodiment in which the IMU sensor is provided as the tilt detection sensor 536 will be described.

The IMU sensor may be disposed on the robot body 100. More specifically, the IMU sensor may be disposed adjacent to the controller 510. The IMU sensor may be provided by being mounted on a PCB inside the robot body 100. To increase the measurement accuracy of the tilt angle and direction, the IMU sensor is preferably disposed close to a central area of the robot body 100.

The IMU sensor may measure at least one of the three-axis acceleration, the three-axis angular velocity, and the three-axis geomagnetic data of the robot body 100 and transmit the same to the controller 510.

The controller 510 may calculate the tilted direction and angle of the robot body 100 using at least one of the acceleration, angular velocity, and geomagnetic data received from the IMU sensor. Based on the same, the controller 510 may perform control of maintaining the horizontal attitude of the robot body 100 to be described below.

The sensor unit 530 may include a fall prevention sensor 537 for detecting a cliff.

The fall prevention sensor 537 may be configured to detect a distance to the ground in front of the robot 1 along which it travels. The fall prevention sensor 537 may be configured in various ways within a range in which a relative distance between a point at which the fall prevention sensor 537 is formed and the ground may be detected.

For example, the fall prevention sensor 537 may include a light emitting unit for emitting light and a light receiving unit for receiving reflected light. The fall prevention sensor 537 may be configured as an infrared sensor. The fall prevention sensor 537 may be referred to as a cliff sensor.

The fall prevention sensor 537 may be disposed on the robot body 100. More specifically, the fall prevention sensor 537 may be disposed inside the front cover 110 of the robot body 100. Preferably, the fall prevention sensor 537 may be disposed inside a downward slope provided on the front cover 110. Therefore, the fall prevention sensor 537 may radiate light toward a front floor surface of the robot 1. That is, the fall prevention sensor 537 disposed inside the front slope may detect in advance whether a cliff is present in front of the robot 1 in a proceeding direction.

The light emitting unit of the fall prevention sensor 537 may radiate light obliquely toward the front floor surface. The light receiving unit of the fall prevention sensor 537 may receive incident light reflected from the floor surface. A distance between the front ground and the fall prevention sensor 537 may be measured based on a difference between a radiation time point and a reception time point of light.

When the distance measured by the fall prevention sensor 537 exceeds a predetermined value or exceeds a predetermined range, there may be a case where the front ground is suddenly lowered. With this principle, a cliff may be detected.

When the cliff is detected ahead, the controller 510 may control the wheel motor MW so that the robot 1 travels while avoiding the detected cliff. In this case, control of the wheel motor MW may be stop control. Alternatively, control of the wheel motor MW may be change control of a rotation direction.

The fall prevention sensor 537 may be additionally disposed inside the rear cover 120 of the robot body 100. Preferably, the fall prevention sensor 537 may be disposed inside a downward slope provided on the rear cover 120. Therefore, the fall prevention sensor 537 may radiate light toward a rear floor surface of the robot 1. That is, the fall prevention sensor 537 disposed inside the rear slope may detect in advance whether a cliff is present behind the robot in a proceeding direction.

The sensor unit 530 may include a contact detection sensor 538.

The contact detection sensor 538 may detect whether the wheel 310 has been in contact with the ground.

The contact detection sensor 538 may include a time of flight (TOF) sensor **538*a* for measuring a separation distance between the wheel 310 of the robot 1 and the ground. The TOF sensor 538*a*** may be a three-dimensional (3D) camera to which a TOF technology is applied. As is well known, the TOF technology is a technology of measuring a distance to an object based on a round-trip flight time in which light radiated toward the object is reflected and returned.

The TOF sensor **538*a* may be disposed on the wheel unit 300. For example, the contact detection sensor 538 may be disposed on each of the left and right wheel housings 320. Whether the wheel 310 is in contact with the ground may be determined through the distance to the ground measured by the TOF sensor 538*a*. When the distance measured by the TOF sensor 538*a* is less than a preset distance (or less than the lower limit of a preset distance range), the wheel 310 is in a state of being in contact with the ground. When the distance measured by the TOF sensor 538*a* is the preset distance or more (or the upper limit or more of the preset distance range), the wheel 310** is in a state of being spaced from the ground.

The contact detection sensor 538 may include a load cell **538*b* that measures a magnitude of a force applied to some components of the robot 1**.

As is well known, when the force is applied to the load cell **538*b*, a resistance value of a strain gauge provided on the surface changes. In this case, the magnitude of the force applied to the load cell 538*b*** may be measured by changing the resistance value.

The load cell **538*b* may be disposed on the leg unit 200. Preferably, the load cell 538*b* may be disposed on each of the left and right third link bodies 231. While the wheel 310 is in a state of being in contact with the floor, the third link 230 is deformed by applying a normal force from the ground. A measured value of the load cell 538*b* is shown as a value different from an initial value depending on the deformation of the third link 230. Therefore, it may be determined whether the wheel 310** is in a state of being in contact with the ground.

The sensor unit 530 may include an environmental sensor 539.

The environmental sensor 539 may be configured to measure various environmental states outside the robot 1, that is, at home in which the robot 1 travels. The environmental sensor 539 may include at least one of a temperature sensor **539*a*, a humidity sensor 539*b*, and a dust sensor 539*c***.

The environmental sensor 539 may be disposed on the robot body 100. More specifically, the environmental sensor 539 may be disposed behind the robot body 100. As a possible embodiment, information measured by the environmental sensor 539 may be visually displayed on a display unit 554.

The interface unit 550 may include at least one component for interaction between the user and the robot 1, and each component may be provided to input a command from the user and/or output information to the user.

The interface unit 550 may include a microphone 551.

The microphone 551 is a component for recognizing the user's voice and may be provided in plural. The microphone 551 may be disposed in the upper functional module 700. More specifically, the microphone 551 may be disposed in the interaction upper functional module 700. The microphone 551 may be disposed adjacent to the display of the interaction upper functional module 700. Preferably, a total of four microphones 551 may be disposed with two microphones disposed on each of upper and lower portions of the display.

A voice signal received by the microphone 551 may be used to track the user's location. In this case, a known sound source tracking algorithm may be applied. For example, the sound source tracking algorithm may be a three-point measurement method (triangulation method) using a time difference in which a plurality of microphones 551 receive voice signals. The principle is that a location of the voice source is calculated using a location of each microphone 551 and a speed of a sound wave.

Meanwhile, when the microphone 551 cooperates with the second camera 532, the robot 1 may be implemented to find the user's location even when the user calls the robot 1 from a distance.

The interface unit 550 may include a speaker 552.

The speaker 552 may be disposed in the upper functional module 700. For example, the speaker 552 may be disposed adjacent to the display of the interaction upper functional module 700. The speaker 552 may be disposed on the upper portion of the display and provided at each of left and right sides thereof.

The speaker 552 may transmit information about the robot 1 as sound. The source of the sound transmitted by the speaker 552 may be sound data previously stored in the robot 1. For example, the pre-stored sound data may be voice data of the robot 1. For example, the pre-stored sound data may be a notification sound that guides the state of the robot 1.

The interface unit 550 may include the manipulation unit 553.

The manipulation unit 553 may receive a command that controls the power of the robot 1 to be turned on/off from the user.

A power-on operation may mean supplying power to the controller 510. A power-off operation may mean cutting-off the power supply to the controller 510. The power is suppled from the battery 560.

The power-off of the robot 1 through the manipulation unit 553 may mean complete power cutoff and have a different meaning from a power saving mode that temporarily stops power supply to each functional module. Control of the power saving mode may be performed by the controller 510 in a power-on state.

Meanwhile, since it is rare to completely cut off the power supply to the robot 1 serving as a pet or butler, it is preferable that the manipulation unit 553 is disposed behind the robot body 100.

The user's command to the manipulation unit 553 may be an operation of pivoting the manipulation unit 553 in the vertical direction or left-right direction. When the manipulation unit 553 is pivoted to one side by the user, the robot 1 may be turned on. When the manipulation unit 553 is pivoted by the user to the other side opposite to the one side, the robot 1 may be turned off.

However, a form of the manipulation unit 553 is not limited. As another example, the manipulation unit 553 may be a button for receiving an on/off command through the user's push operation. As another example, the manipulation unit 553 may be a sliding button for receiving the on/off command through the user's sliding operation. As still another example, the manipulation unit 553 may be a touch screen for receiving the on/off command through the user's touch operation.

The interface unit 550 may include the display unit 554 and an input unit 555.

The display unit 554 may include a display disposed in one or more modules. The display unit 554 may include a first display disposed on the front cover 110 of the robot body 100. The display unit 554 may include a second display disposed in the upper functional module 700.

The first and second displays may be formed as any one of a light emitting diode (LED), a liquid crystal display (LCD), a plasma display panel, and an organic light emitting diode (OLED).

Information such as operating time information of the robot 1 and power information of the battery 560 may be displayed on the first display or the second display.

The facial expression of the robot 1 may be displayed on the second display. Alternatively, the eyes of the robot 1 may be displayed on the second display. The current state of the robot 1 may be expressed by being personified as emotions through a facial shape or eye shape displayed on the second display. For example, when the user returns home after going out, a smiling facial expression or smiling eye shape may be displayed on the second display. Therefore, the user may feel the interaction with the robot 1.

The input unit 555 may be configured to receive a control command for controlling the robot 1 from the user. For example, the control command may be a command for changing various settings of the robot 1. For example, the settings may be voice volume, display brightness, power saving mode settings, etc.

The input unit 555 may be disposed on the front cover 110 of the robot body 100. The input unit 555 may be disposed adjacent to or on the first display.

The input unit 555 generates key input data input by the user to control the operation of the robot 1. To this end, the input part 555 may be composed of a key pad, a dome switch, a touch pad (static pressure/electrostatic), etc. In particular, when the touch pad forms a layered structure with the first display, this may be referred to as a touch screen.

The battery 560 is configured to supply power to other components constituting the robot 1.

The battery 560 may be disposed on the robot body 100. More specifically, the battery 560 may be disposed at the rear side of the robot body 100. The battery 560 may be disposed behind the suspension motor MS.

The battery 560 may be charged by an external power source, and to this end, a charging terminal 152 for charging the battery 560 may be provided at one side of the robot body 100 or on the battery 560. As in the embodiment of the present disclosure, the charging terminal 152 may be disposed on the lower cover 150 of the robot body 100. Therefore, the robot 1 may be easily coupled to the charging station in a manner of approaching the charging station and seating the charging terminal 152 on the corresponding terminal of the charging station from the top.

The memory 570 is a component for storing various pieces of data for driving and operating the robot 1.

The memory 570 may store an application program and various pieces of data for autonomous driving of the robot 1. The memory 570 may also store pieces of data sensed by the sensor unit 530 and setting information for various settings selected or input by the user.

The memory 570 may include magnetic storage media or flash storage media, but the scope of the present disclosure is not limited thereto. The memory 570 may include an internal memory and/or an external memory and include volatile memories such as DRAMs, SRAMs, or SDRAMs, non-volatile memories such as one time programmable ROMs (OTPROMs), PROMs, EPROMS, EEPROMs, mask ROMs, flash ROMs, NAND flash memories, or NOR flash memories, flash drives such as SSD, compact flash (CF) cards, SD cards, Micro-SD cards, Mini-SD cards, XD cards, or memory sticks, or storage devices such as HDDs.

The memory 570 may be included in the controller 510 or provided as a separate component.

The communication unit 580 may be provided to transmit signals between internal components of the robot 1. The communication unit 580 may support, for example, controller area network (CAN) communication. The signals may be, for example, control commands transmitted from the controller 510 to another component.

The communication unit 580 may support wireless communication with other devices present outside the robot 1. A short-range communication module or a long-distance communication module may be provided as a wireless communication module for supporting wireless communication.

The short-distance communication may be, for example, Bluetooth communication, near field communication (NFC), etc.

The long-distance communication may be, for example, Wireless LAN (WLAN), Digital Living Network Alliance (DLNA), Wireless Broadband (Wibro), World Interoperability for Microwave Access (WiMAX), Global System for Mobile communication (GSM), Code Division Multi Access (CMDA), CDMA2000, Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), IEEE 802.16, Long Term Evolution (LTE), Long Term Evolution-Advanced (LTEA), Wireless Mobile Broadband Service (WMBS), Bluetooth Low Energy (BLE), Zigbee, Radio Frequency (RF), or Long Range (LoRa).

Hereinafter, a method of controlling horizontal attitude maintenance of the robot 1 will be described in detail with reference to FIGS. 16 to 20.

FIG. 16 is a flowchart showing the method of controlling the horizontal attitude maintenance of the robot according to the embodiment of the present disclosure, FIG. 17 is a flowchart showing a detailed flow of operation S100 in FIG. 16, FIG. 18 is a flowchart showing a detailed flow of a method of correcting the front and rear tilt of a robot body in FIG. 16, FIG. 19 is a flowchart showing a detailed flow of a method of correcting the left and right tilt of the robot body in FIG. 16, and FIGS. 20A to 20G are schematic diagrams of an embodiment of the robot in which the control method of FIG. 16 is performed.

Referring to FIGS. 16 to 20, the method for controlling the horizontal attitude maintenance of the robot 1 according to the embodiment of the present disclosure may include an attitude measuring operation (S100) and a motor driving operation (S200). The above operations may be performed by the controller 510 embedded in the robot body 100.

The attitude measuring operation (S100) is an operation of measuring a tilted direction and tilt value of the robot 1 compared to a preset horizontal tilt.

The preset horizontal tilt can be defined as the tilt of the robot body 100 in a state in which the robot 1 travels on a ground without a slope. In this case, the preset horizontal tilt may be a numerically preset specific tilt value or a tilt value within a specific preset range.

That is, when the horizontal tilt is set to a specific value, a state outside this value may be detected as a tilted state of the robot body 100. Alternatively, when the horizontal tilt is set to a specific range having upper and lower limits, a state outside this range may be detected as a tilted state of the robot body 100.

The attitude measurement of the robot 1 may be performed by the IMU sensor 536. More specifically, the attitude measurement may be the measurement of the tilted state of the robot body 100 and performed by the controller 510 receiving a value measured by the IMU sensor 100. In this case, the set value or set range of the horizontal tilt may be stored in the memory 570.

The attitude of the robot 1 maintaining the preset horizontal tilt may be referred to as a reference attitude.

When receiving the measured value of the IMU sensor 536, the controller 510 may determine the tilted direction of the robot body 100 compared to the preset horizontal tilt (S120, S130).

The tilted direction of the robot body 100 may be forward or backward. The forward tilt state is a state in which the robot body 100 is tilted forward and downward compared to the reference attitude. The backward tilt state is a state in which the robot body 100 is tilted backward and downward compared to the reference attitude.

The tilted direction of the robot body 100 may be leftward or rightward. The rightward tilt state is a state in which the robot body 100 is tilted rightward and downward compared to the reference attitude. The leftward tilt state is a state in which the robot body 100 is tilted leftward and downward compared to the reference attitude.

The motor driving operation (S200) is an operation of driving the suspension motor MS or the wheel motor MW according to the tilted direction of the robot body 100 compared to the reference attitude.

Front-Rear Horizontal Control

When the robot body 100 is tilted forward or backward compared to the reference attitude, the controller 510 corrects a tilt by controlling the driving of the wheel motor MW (S211).

When the robot body 100 is tilted forward, it is necessary to make the robot body 100 stand up backward. When the robot body 100 is tilted backward, it is necessary to make the robot body 100 stand up forward. In this case, since the left and right sides of the robot body 100 need to be made stand up at the same time, the controller 510 simultaneously controls the driving of the left wheel motor MS_L and the right wheel motor MS_R of the robot body 100.

The controller 510 controls the driving of the left and right wheel motors MW so that the wheel 310 rotates in a direction opposite to the tilted direction of the robot body 100.

More specifically, referring to FIGS. 18 and 20A, when the robot body 100 is tilted forward, the wheel motor MW is controlled so that the left and right wheels 310 simultaneously rotate backward. In this case, the suspension motor MS is not driven and maintained in a stopped state.

When only the wheel motor MW is driven while the suspension motor MS is stopped, an angle between the first link 210 and the third link 230 is maintained as a first angle θ1, which is an angle in the reference attitude. Here, the angle between the first link 210 and the third link 230 can be defined as an angle formed by a virtual extension line passing the center C3 of the link coupling portion 213 of the first link 210 and the center C5 of the wheel coupling portion 234 of the third link 230 meeting a virtual extension line passing the center C1 of the first link coupling hole 131 and the center C3 of the link coupling portion 213 of the first link 210.

When the wheel 310 rotates backward, the other end of the third link 230 rotates backward about the wheel coupling portion 234 of one end thereof. Describing the same from another perspective, a rotation direction of the other end of the third link 230 is clockwise based on a state of viewing the robot 1 from the right side and is counterclockwise based on a state of viewing the robot 1 from the left side.

Since the other end of the third link 230 rotates and a size of the angle between the first link 210 and the third link 230 is maintained, the first link 210 also rotates backward, and the robot body 100 in which the first link 210 is connected to the side frame 130 also rotates backward.

Referring to FIGS. 18 and 20B, when the robot body 100 is tilted backward, the wheel motor MW is controlled so that the left and right wheels 310 simultaneously rotate forward. In this case, the suspension motor MS is not driven and maintained in a stopped state.

When only the wheel motor MW is driven while the suspension motor MS is stopped, an angle between the first link 210 and the third link 230 is maintained as a first angle $\theta 1$, which is an angle of the reference attitude. When the wheel 310 rotates forward, the other end of the third link 230 rotates forward about the wheel coupling portion 234 of one end thereof. Describing the same from another perspective, a rotation direction of the other end of the third link 230 is counterclockwise based on a state of viewing the robot 1 from the right side and is clockwise based on a state of viewing the robot 1 from the left side.

Since the other end of the third link 230 rotates and the size of the angle between the first link 210 and the third link 230 is maintained, the first link 210 also rotates forward, and the robot body 100 in which the first link 210 is connected to the side frame 130 also rotates forward.

The driving control of the wheel motor MW by the controller 510 is repeated until the robot body 100 achieves the horizontal tilt (S211, S212). In this case, whether the horizontal tilt is achieved may be determined based on periodically receiving the measured value of the IMU sensor 536.

Therefore, the robot body 100 tilted forward or backward may recover the reference attitude. The robot 1 recovering the reference attitude may return to the previously performed operation (S213). That is, when traveling in a specific direction, the robot 1 may continuously travel, and when waiting in a stationary attitude, the robot 1 may continuously wait in a stationary state.

Left-Right Horizontal Control

When the robot body 100 is tilted leftward or rightward compared to the reference attitude, the controller 510 corrects a tilt by controlling the driving of the suspension motor MS.

The driving of the suspension motor MS varies the angle between the first link 210 and the third link 230 by rotating the first link 210.

The controller 510 may correct the tilt by sequentially driving the left suspension motor MS_L and the right suspension motor MS_R of the robot body 100 or controlling an operation of any one of the suspension motors.

More specifically, the controller 510 first attempts to correct the tilt only by controlling the driving of any one of the left suspension motor MS_L and the right suspension motor MS_R (S221). In this case, the tilt is corrected by sequentially controlling the driving of the other when the tilt correction is not achieved even when any one of the left and right suspension motors is driven maximally (S225).

The control of the horizontal attitude maintenance by the driving of the suspension motor MS should be performed repeatedly to maintain the attitude even in a stationary state, except for a case of obstacle climbing to be described as an example. When a large amount of power is consumed in such attitude maintenance control, the battery 560 is discharged quickly and frequent charging causes inconvenience in using the robot 1.

According to the embodiment of the present disclosure, the horizontal attitude maintenance control may be performed with less power compared to a case where the left and right suspension motors MS are driven simultaneously. This leads to an increase in the usage time of the robot 1, and the charging cycle may be longer, thereby increasing user assistance efficiency.

Referring to FIG. 20C, a situation in which the robot 1 climbs a small obstacle while traveling is shown. At the beginning of obstacle climbing, the robot 1 is tilted to one side. In order for the robot 1 to maintain the horizontal attitude while climbing the obstacle, the wheel 310 needs to be lifted in a direction opposite to the direction in which the robot body 100 is tilted.

The controller 510 first controls the driving of the suspension motor MS disposed at the other side that is a direction opposite to one side that is the tilted direction of the robot body 100 (S221). In this case, the controller 510 controls the driving of the suspension motor MS disposed at the other side so that the angle between the first link 210 and the third link 230 that are disposed at the other side is reduced. Describing the same from another perspective, the controller 510 controls the driving of the suspension motor MS at the other side so that the wheel 310 disposed at the other side moves upward.

Meanwhile, before the suspension motor MS is driven, the above angle is the first angle $\theta 1$, which is the angle in the reference attitude.

FIG. 20C shows an embodiment in which the robot 1 is tilted to the left, and the method of controlling the horizontal attitude maintenance will be described based on the same.

In the embodiment of FIG. 20C, one tilted side is left and the other side is right. That is, the controller 510 first controls the driving of the right suspension motor MS_R. More specifically, the controller 510 controls the driving of the right suspension motor MS_R and controls the driving so that an angle between a first link 210_R and a third link 230_R that are disposed at the right side is reduced. While the right suspension motor MS_R is driven, the left suspension motor MS_L is not driven. That is, the right suspension motor MS_R and the left suspension motor MS_L are controlled to be selectively driven during horizontal attitude maintenance control.

When the controller 510 drives the right suspension motor MS_R in a direction of decreasing the first angle $\theta 1$, the link coupling portion 213 moves upward as the first link 210_R rotates about the motor coupling unit 212. In this case, the third link 230_R moves according to the rotation of the first link 210_R, and a second link 220_R is rotated by being pushed by the third link 230_R. In addition, one end where the third link 230_R is coupled to the second link 220_R moves backward, and the other end where the third link 230_R is coupled to a wheel 310_R moves upward. As a result, the wheel 310_R moves upward.

The driving control of the suspension motor MS disposed at the other side by the controller 510 is repeated until the robot body 100 achieves the horizontal tilt or until the other wheel 310 can no longer be moved upward (S221, S222, S224). In this case, whether to achieve the horizontal tilt may be determined based on periodically receiving the measured value of the IMU sensor 536.

An embodiment of FIG. 20D shows a case in which the tilt of the robot body 100 is corrected only by controlling the driving of the right suspension motor MS_R, that is, a state in which the horizontal tilt is achieved by controlling the driving of only one suspension motor MS.

In this case, a second angle $\theta 2$, which is an angle between the first link 210_R and the third link 230_R that are disposed at the right side, has a smaller value than the first angle θ1. An angle between the first link 210_L and the third link 210_L that are disposed at the left side still maintains the first angle θ1.

When the horizontal tilt is achieved, the controller 510 controls the suspension motor MS (right suspension motor MS_R in the embodiment of FIGS. 20C and 20D) disposed at the other side to stop. Then, the robot 1 recovering the reference attitude may return to the previously performed operation. That is, the robot 1 may continuously travel (S223).

Meanwhile, when traveling downward from an obstacle, the wheel 310 may be moved downward by a restoring force generated by a torsion spring coupled between the first link 210 and the third link 230. That is, when the angle between the first link 210 and the third link 230 returns from the second angle θ2 to the first angle θ1, the wheel 310 may move downward without controlling the driving of the suspension motor MS.

Next, referring to FIG. 20E, a situation in which the robot 1 climbs a large obstacle while traveling is shown. At the beginning of obstacle climbing, the robot 1 is greatly tilted to one side. In order for the robot 1 to maintain the horizontal attitude while climbing the large obstacle, the wheel 310 needs to be lifted in a direction opposite to the direction in which the robot body 100 is tilted.

The controller 510 first controls the driving of the suspension motor MS disposed at the other side that is a direction opposite to one side that is the tilted direction of the robot body 100 (S221). In this case, the controller 510 controls the driving of the suspension motor MS disposed at the other side so that the angle between the first link 210 and the third link 230 that are disposed at the other side is reduced. Describing the same from another perspective, the controller 510 controls the driving of the suspension motor MS at the other side so that the wheel 310 disposed at the other side moves upward.

Even in the embodiment of FIG. 20E, an example in which the tilted one side is set to the left and the other side is set to the right. That is, the controller 510 first controls the driving of the right suspension motor MS_R. More specifically, the controller 510 controls the driving of the right suspension motor MS_R and controls the driving so that an angle between a first link 210_R and a third link 230_R that are disposed at the right side is reduced. While the right suspension motor MS_R is driven, the left suspension motor MS_L is not driven. That is, the right suspension motor MS_R and the left suspension motor MS_L are controlled to be selectively driven during horizontal attitude maintenance control.

Referring to FIG. 20F, for climbing the large obstacle, the angle between the right first link 210_R and the third link 230_R may continuously decrease and eventually reaches a minimum critical angle θ3 that may not be decreased any more.

In a possible embodiment, the minimum critical angle θ3 may be an angle in a state in which the above angle may not decrease any more due to the structural limitation of the four-bar linkage structure. In another possible embodiment, the minimum critical angle θ3 may be an angle in which a preset positive (+) margin is given to the structural limitation angle. The minimum critical angle θ3 may be stored in the memory 570.

Meanwhile, describing the same from another perspective, a state in which the angle between the first link 210 and the third link 230 is the minimum critical angle θ3 can be defined as a state in which the wheel 310 connected to the third link 230 moves upward to a maximum height.

Referring to FIG. 20G, when the angle between the right first link 210_R and the third link 230_R reaches the minimum critical angle θ3 by the driving of the right suspension motor MS_R in a state in which the horizontal tilt has not yet been achieved, the suspension motor MS disposed at one side, which is the direction in which the robot body 100 is tilted (the left suspension motor MS_L in the embodiment of FIGS. 20E to 20G), is controlled by being subsequently driven. In this case, the right suspension motor MS_R is controlled to stop (S222, S224, S225).

In this case, the controller 510 may control the driving of the suspension motor MS disposed toward one side at which the robot body 100 is tilted and control the above driving so that the angle between the first link 210 and the third link 230 that are disposed at the one side increases. That is, based on the embodiment shown in FIG. 20G, the driving of the left suspension motor MS_L is controlled so that the angle formed between the left first link 210_L and the third link 210_R increases.

When the controller 510 drives the left suspension motor MS_L, the angle between the left first link 210_L and the third link 210_R gradually increases from the first angle θ1, which is the angle in the reference attitude. In this case, the link coupling portion 213 moves downward as the first link 210_L rotates about the motor coupling portion 212. In this case, the third link 230_L moves according to the rotation of the first link 210_L, and the second link 220_L is rotated by being pushed by the third link 230_L. In addition, one end where the third link 230_L is coupled to the second link 220_L moves forward, and the other end where the third link 230_L is coupled to the wheel 310_L moves downward. As a result, the wheel 310_L moves downward.

The driving control of the suspension motor MS disposed at one side by the controller 510 is repeated until the robot body 100 achieves the horizontal tilt or until the wheel 310 disposed at one side may no longer move downward. In this case, whether to achieve the horizontal tilt may be determined based on periodically receiving the measured value of the IMU sensor 536 (S225, S226, S227).

The embodiment of FIG. 20G shows a case where the tilt of the robot body 100 has been corrected by sequentially controlling the driving of the right suspension motor MS_R and the left suspension motor MS_L, that is, a state in which the horizontal tilt has been achieved.

In this case, a third angle θ3, which is an angle between the first link 210_R and the third link 230_R that are disposed at the right side, is the minimum critical angle. Of course, the third angle θ3 has a smaller value than the reference angle θ1. In addition, a fourth angle θ4, which is an angle between the left first link 210_L and the third link 230_R, has a greater value than the first angle θ1, which is the reference angle.

When the horizontal tilt is achieved, the controller 510 controls the suspension motor MS (right suspension motor MS_R in the embodiment of FIGS. 20E to 20G) disposed at one side to stop. Then, the robot 1 recovering the reference attitude may return to the previously performed operation. That is, the robot 1 may continuously travel (S228).

Meanwhile, returning the angle between the first link 210 and the third link 230 from the third angle θ3 to the first angle θ1 and returning the same from the fourth angle θ4 to the first angle θ1 may be achieved by the restoring force of the torsion spring without controlling the driving of the suspension motor MS.

Although not shown as another embodiment, in the case of climbing a very large obstacle, the angle between the first link 210 and the third link 230 disposed at one side, which is the tilted direction of the robot body 100, may continuously increase and finally reach a maximum critical angle θ5 that may not be increased any more.

In a possible embodiment, the maximum critical angle θ5 may be an angle in a state in which the above angle may not increase any more due to the structural limitation of the four-bar linkage structure. In another possible embodiment, the maximum critical angle θ5 may be an angle in which a preset negative (−) margin is given to the structural limitation angle. The maximum critical angle θ5 may be stored in the memory 570.

Meanwhile, describing the same from another perspective, a state in which the angle between the first link 210 and the third link 230 is the maximum critical angle θ5 can be defined as a state in which the wheel 310 connected to the third link 230 moves upward to a minimum height.

In a state in which the horizontal tilt has not yet been achieved, when the angle between the first link 210 and the third link 230 that are disposed at one side, which is the tilted direction of the robot body 100, is the maximum critical angle θ5 and the angle between the first link 210 and the third link 230 that are disposed at the other side, which is the other side that is the direction opposite to the one side is the minimum critical angle θ3, the robot 1 may maintain the state of being the maximum critical angle θ5 and the minimum critical angle θ3 for each of the left and right leg units 200 (S226, S227).

That is, the controller 510 may stop both the left and right suspension motors MS and return the robot 1 to the previous operation. Therefore, the robot 1 may finish climbing the obstacle while minimally maintaining the tilted state of the robot body 100. Then, the robot 1 may return to the previous operation (S228).

As described above, when the horizontal posture maintenance control is performed, the horizontality of the robot body 100 is always maintained while traveling indoors, and thus the robot 1 can safely transport objects.

In addition, there is an advantage that the robot 1 can wait anywhere at home by continuously correcting its attitude even when waiting for the user command in a stationary attitude and immediately response to the user command at any time.

In addition, when the robot body 100 is tilted in the left-right direction, a discharging speed of the battery 560 may be delayed by sequentially or selectively controlling the suspension motor MS.

So far, the method for controlling the horizontal attitude maintenance of the robot according to the embodiment of the present disclosure has been described. In the present specification, although the embodiment in which the robot body 100 is tilted to the left has been representatively described, an embodiment in which the robot body 100 is tilted to the right may also be performed by the same control method in which only the direction of the suspension motor MS is reversed.

Hereinafter, a method for detecting and controlling a state in which the robot 1 is in contact with the ground will be described.

FIG. 21 is a flowchart showing a ground contact detection control method of the robot according to the embodiment of the present disclosure.

When the wheel 310 travels while rotating in a state of being in contact with the ground, a frictional force acts between the wheel 310 and the ground. A case where the robot 1 is lifted by a user for a specific purpose is assumed. When the robot 1 is lifted and the wheel 310 is spaced apart from the ground, the friction force disappears and the wheel 310 rotates at high speed. When the user places the robot 1 back on the ground while the wheels 310 rotate at high speed, the robot 1 may not easily maintain balance and may fall over due to the wheels 310 rotating at high speed.

In an embodiment of the present disclosure, when detecting that the wheel 310 is spaced apart from the ground, the controller 510 may stop driving the wheel motor MW so that the wheel 310 stops rotating.

To this end, as described above with reference to the block diagram of FIG. 15, the robot 1 according to the embodiment of the present disclosure may include a contact detection sensor 538 for detecting the state in which the wheel 310 is in contact with the ground.

The contact detection sensor 538 includes a TOF sensor 538*a* for measuring a distance to the ground, and a load cell 538*b* for detecting a normal force received by the leg unit 200 from the ground.

The controller 510 may determine whether the wheel 310 is in a state of being spaced apart from the ground based on the distance measured and transmitted by the TOF sensor 538*a* and the deformation of a strain gauge measured and transmitted by the load cell 538*b*.

With reference to FIG. 21, each operation of the ground contact detection control method using the TOF sensor 538*a* and the load cell 538*b* will be described in more detail as follows.

First, the controller 510 receives each of the measured value of the TOF sensor 538*a* and the measured value of the load cell 538*b* (S510).

When the measured value of the TOF sensor 538*a* is smaller than a preset value, the controller 510 may determine that the wheel 310 is in contact with the ground and control the driving of the wheel motor MW to be maintained (S520, S530).

When the measured value of the TOF sensor 538*a* is greater than or equal to the preset value, there is a possibility that the wheel 310 is spaced apart from the ground. However, when the determination is made using only the measured value of the TOF sensor 538*a*, incorrect determination may be made within an error range of the sensor. Alternatively, incorrect determination may be made even when the wheel 310 is in contact with the ground and there is a cliff in a direction in which the TOF sensor 538*a* radiates light.

For the above reasons, when there occurs an error in which it is determined that the wheels 310 are in a state of being in contact with the ground but are spaced apart therefrom, the robot 1 may suddenly stop traveling.

Such a problem may be compensated through the measured value of the load cell 538*b*.

Even when the measured value of the TOF sensor 538*a* is greater than or equal to the preset value, when the measured value of the load cell 538*b* is not equal to the initial value, the controller 510 may control the driving of the wheel motor MW to be maintained (S540, S530).

More specifically, when the measured value of the load cell 538*b* is not equal to the initial value, it means that there is deformation in the strain gauge. That is, there is deformation in the third link body 231 on which the load cell 538*b* is disposed, which means a state in which the wheel unit 300 and the leg unit 200 connected to the wheel unit 300 receive the vertical force applied from the ground. That is, in this case, the controller 510 may determine that the wheel 310 is in a state of being in contact with the ground and control the driving of the wheel motor MW to be maintained.

When the measured value of the TOF sensor 538*a* is greater than or equal to the preset value and the measured value of the load cell 538*b* is equal to the initial value, the controller 510 may control the driving of the wheel motor MW to stop (S540, S550).

More specifically, when the measured value of the load cell 538*b* is equal to the initial value, it means that no deformation has been in the strain gauge. That is, there is no deformation in the third link body 231 on which the load cell 538*b* is disposed, which means a state in which the wheel unit 300 and the leg unit 200 connected to the wheel unit 300 do not receive the vertical force applied from the ground. That is, in this case, the controller 510 may determine that the wheel 310 is in a state of being spaced apart from the ground and control the driving of the wheel motor MW to stop.

Meanwhile, when it is determined that the wheel 310 is spaced apart from the ground, the above-described horizontal attitude maintenance control is not performed. That is, the controller 510 may control the driving of the wheel motor MW to stop regardless of the tilting degree of the robot body 100.

As described above, when the wheel 310 is spaced apart from the ground, the wheel motor MW is controlled to stop, and thus the robot 1 can easily maintain balance without falling over even when the robot 1 is lifted and put back down.

In addition, by performing ground contact detection control simultaneously using the measured values of the TOF sensor 538*a* and the load cell 538*b*, the detection error of the TOF sensor 538*a* can be corrected. Therefore, it is possible to increase the accuracy of the robot 1 control.

Meanwhile, the block diagrams disclosed in the present disclosure may be construed by those skilled in the art as a conceptual representation of a circuit for implementing the principles of the present disclosure. Similarly, the fact that any flow chart, flowchart, state transition diagram, pseudocode, etc. may be substantially represented in a computer-readable medium to show various processes executable by a computer or processor regardless of whether the computer or processor are explicitly shown will be recognized by those skilled in the art.

Therefore, the above-described embodiments of the present disclosure may be prepared as a computer-executable program and implemented in a general-purpose digital computer for operating the program using a computer-readable storage medium. The computer-readable storage medium may include storage media such as a magnetic storage medium (e.g., a read only memory (ROM), a floppy disk, or a hard disk) and an optical reading medium (e.g., a compact disc ROM (CD-ROM) or a digital video disc (DVD)).

Functions of the various elements shown in the drawings may be provided using dedicated hardware as well as hardware capable of executing software in conjunction with appropriate software. When provided by a processor, these functions may be provided by a single dedicated processor, a single shared processor, or a plurality of individual processors whose some may be shared.

In addition, the explicit use of the term "processor" or "controller" should not be construed to refer exclusively to hardware capable of executing software and may implicitly include, without limitation, digital signal processor (DSP) hardware, a ROM for storing software, a random access memory (RAM), and a non-volatile storage.

Although one specific embodiment of the present disclosure has been described and shown above, the present disclosure is not limited to the described embodiments, and those skilled in the art can change and modify the present disclosure to other specific embodiments in various ways without departing from the spirit and scope of the present disclosure. Therefore, the scope of the present disclosure should not be determined by the described embodiments but should be determined by the technical spirit stated in the claims.

The invention claimed is:

1. A robot comprising:

a robot body;

a battery accommodated in the robot body;

a first leg and a second leg, each leg coupled to opposite first and second sides of the robot body, respectively;

a first wheel assembly and a second wheel assembly rotatably coupled to the first leg and the second leg, respectively, the first wheel assembly and the second wheel assembly including a first wheel and a second wheel, respectively;

a first suspension motor and a second suspension motor accommodated in the robot body, the first suspension motor and the second suspension motor being configured to drive the first leg and the second leg, respectively, the first suspension motor and the second suspension motor being configured to be sequentially driven when the robot body is tilted towards the first side or towards the second side when compared to a preset horizontal tilt of the robot body;

a first wheel motor and a second wheel motor accommodated in the first wheel assembly and the second wheel assembly, respectively, the first wheel motor and the second wheel motor being configured to provide a driving force to the first wheel and the second wheel, respectively, the first wheel motor and the second wheel motor being configured to be driven simultaneously when the robot body is tilted forward or backward when compared to the preset horizontal tilt; and a contact detection sensor, wherein, based on a signal from the contact detection sensor, each wheel motor is configured to stop driving the respective wheel regardless of a tilted degree of the robot body, when the respective wheel is spaced apart from a ground.

2. The robot of claim 1, wherein the first wheel motor and the second wheel motor are configured to be driven so that the first wheel and the second wheel rotate backward when a tilted direction of the robot body is forward.

3. The robot of claim 2, wherein the first wheel motor and the second wheel motor are configured to be driven so that the first wheel and the second wheel rotate forward when the tilted direction of the robot body is backward.

4. The robot of claim 3, wherein, when the first wheel motor and the second wheel motor are driven in an opposite direction to the tilted direction, the first suspension motor and the second suspension motor are configured to be maintained in a stopped state.

5. The robot of claim 1, wherein, when a tilted direction of the robot body is toward the first side, the second suspension motor is configured to be controlled to be driven, and wherein, only when the preset horizontal tilt is not achieved, the first suspension motor is configured to be controlled after the driving of the second suspension motor is finished.

6. The robot of claim 1, further comprising a tilt detection sensor located in the robot body, the tilt detection sensor being configured to detect a tilting degree of the robot body.

7. The robot of claim 1, wherein each leg includes:

a first link, the first link being link-connected to a corresponding side of the first side and the second side of the robot body, the first link being connected to a corresponding suspension motor of the first suspension motor and the second suspension motor;

a second link, the second link being link-coupled to the corresponding side of the robot body to which the first link is coupled; and a third link, the third link being link-coupled to the first link and the second link, the third link being coupled to a corresponding wheel assembly of the first wheel assembly and the second wheel assembly, wherein, when a tilted direction of the robot body is toward the first side, the second suspension motor is configured to be driven such that an angle between the first link and the third link located at the second side decreases.

8. The robot of claim 7, wherein, when the preset horizontal tilt is not achieved and the angle between the second link and the third link that are located at the second side decreases to a preset minimum critical angle, the first suspension motor is configured to be driven so that the angle between the first link and the third link that are located at the first side increases.

9. The robot of claim 8, wherein, when the preset horizontal tilt is not achieved, the angle between the first link and the third link that are located at the first side is a preset maximum critical angle, and the angle between the first link and the third link that are located at the second side is the minimum critical angle, the first suspension motor and the second suspension motor are configured to be driven so that the maximum critical angle and the minimum critical angle are maintained.

10. The robot of claim 1, wherein the contact detection sensor is configured to detect a state in which the first wheel and the second wheel are in contact with the ground.

11. The robot of claim 10, wherein the contact detection sensor includes:

a time of flight (TOF) sensor disposed on each wheel assembly, the time of flight (TOF) sensor being configured to measure a distance to the ground; and a load cell disposed on each leg, the load cell being configured to detect a normal force received by the leg from the ground.

12. A method of controlling a robot, the robot including a robot body, a first leg and a second leg, each leg connected to respective opposite first and second sides of the robot body, a first wheel assembly and a second wheel assembly connected to the first leg and the second leg, respectively, the first wheel assembly and the second wheel assembly including a first wheel and a second wheel, respectively, a first suspension motor and a second suspension motor accommodated in the robot body, the first suspension motor and the second suspension motor configured to drive the first leg and the second leg, respectively, and, a first wheel motor and a second wheel motor accommodated in the first wheel assembly and the second wheel assembly, respectively, the first wheel motor and the second wheel motor being configured to provide a driving force to the first wheel and the second wheel, respectively, the method comprising:

an attitude measuring operation of measuring a tilted direction and a tilt value compared to a preset horizontal tilt of the robot;

a motor driving operation of driving the first suspension motor and the second suspension motor or the first wheel motor and the second wheel motor according to the tilted direction, wherein, when the tilted direction of the robot body is toward the first side or toward the second side, the motor driving operation including sequentially driving the first suspension motor and the second suspension motor or driving any one of the first suspension motor and the second suspension motor;

detecting whether one of the first wheel or the second wheel is spaced apart from a ground; and stopping driving the one of the first wheel or the second wheel regardless of a tilted degree of the robot body when the one of the first wheel or the second wheel is spaced apart from the ground.

13. The method of claim 12, wherein, when the tilted direction of the robot body is forward or backward, the motor driving operation includes controlling driving of the first wheel motor and the second wheel motor so that the first wheel and the second wheel rotate in a direction opposite to the tilted direction.

14. The method of claim 13, wherein, when the first wheel motor and the second wheel motor are driven in the opposite direction to the tilted direction, the motor driving operation includes maintaining the first suspension motor and the second suspension motor in a stopped state.

15. The method of claim 12, wherein, when the robot is tilted towards the first side, the motor driving operation includes:

driving the second suspension motor to raise the second wheel located at the second side;

controlling the driving of the second suspension motor to stop when the second wheel moves upward to a preset maximum height in a state in which the preset horizontal tilt is not achieved, and moving the first wheel disposed downward by controlling driving of the first suspension motor; and controlling the driving of the first suspension motor when the first wheel moves downward to a preset minimum height in the state in which the preset horizontal tilt is not achieved.

16. The method of claim 12, wherein each leg includes:

a first link, the first link being link-connected to a corresponding side of the first side and the second side of the robot body, the first link being connected to a corresponding suspension motor of the first suspension motor and the second suspension motor;

a second link, the second link being link-coupled to the corresponding side of the robot body to which the first link is coupled; and a third link, the third link being link-coupled to the first link and the second link, the third link being coupled to a corresponding wheel assembly of the first wheel assembly and the second wheel assembly, and wherein, when a tilted direction of the robot body is toward the first side, the motor driving operation includes driving the second suspension motor such that an angle between the first link and the third link located at the second side decreases.

17. The method of claim 16, wherein, when the preset horizontal tilt is not achieved and the angle between the second link and the third link that are located at the second side decreases to a preset minimum critical angle, the motor driving operation further include driving the first suspension motor such that the angle between the first link and the third link that are located at the first side increases.

18. The method of claim 17, wherein, when the preset horizontal tilt is not achieved, the angle between the first link and the third link that are located at the first side is a preset maximum critical angle, and the angle between the first link and the third link that are located at the second side is the minimum critical angle, the motor driving operation further includes driving the first suspension motor and the second suspension motor so that the maximum critical angle and the minimum critical angle are maintained.

* * * * *